United States Patent
Hirata et al.

(10) Patent No.: US 8,874,299 B2
(45) Date of Patent: Oct. 28, 2014

(54) VEHICLE CONTROL SYSTEM FOR ELECTRICALLY DRIVEN VEHICLE

(75) Inventors: Takeshi Hirata, Kawasaki (JP); Kaori Tanishima, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 32 days.

(21) Appl. No.: 13/879,779

(22) PCT Filed: Oct. 21, 2011

(86) PCT No.: PCT/JP2011/074343
§ 371 (c)(1),
(2), (4) Date: May 22, 2013

(87) PCT Pub. No.: WO2012/057040
PCT Pub. Date: May 3, 2012

(65) Prior Publication Data
US 2013/0231816 A1  Sep. 5, 2013

(30) Foreign Application Priority Data

Oct. 27, 2010 (JP) ................................. 2010-240335

(51) Int. Cl.
| | |
|---|---|
| *B60W 20/00* | (2006.01) |
| *B60W 10/08* | (2006.01) |
| *B60W 10/02* | (2006.01) |
| *B60L 15/20* | (2006.01) |
| *B60K 6/48* | (2007.10) |
| *B60L 11/14* | (2006.01) |
| *B60W 10/06* | (2006.01) |

(52) U.S. Cl.
CPC ............. *B60W 20/20* (2013.01); *Y02T 10/6286* (2013.01); *B60W 10/08* (2013.01); *B60W 10/02* (2013.01); *B60W 20/00* (2013.01); *Y02T 10/6221* (2013.01); *B60W 2710/025* (2013.01); *B60L 15/2054* (2013.01); *B60K 6/48* (2013.01); *B60L 11/14* (2013.01); *B60W 2520/26* (2013.01); *Y10S 903/946* (2013.01); *B60W 10/06* (2013.01); *Y02T 10/7077* (2013.01)
USPC .............................................. 701/22; 903/946

(58) Field of Classification Search
CPC . B60L 11/14; B60L 15/2054; Y02T 10/6221; Y02T 10/6286; Y02T 10/7077; B60W 20/20; B60W 2710/025; B60W 10/02; B60W 10/06; B60W 10/08; B60W 20/00; B60K 6/48
USPC ......................................................... 701/22
See application file for complete search history.

(56) References Cited

U.S. PATENT DOCUMENTS 7,373,235 B2 * 5/2008 Werner et al. ................... 701/67
2006/0108163 A1 * 5/2006 Kitano et al. ................ 180/65.2

(Continued)

FOREIGN PATENT DOCUMENTS

| JP | 2007-069790 A | 3/2007 |
|---|---|---|
| JP | 2008-068704 A | 3/2008 |

(Continued)

*Primary Examiner* — Mary Cheung
*Assistant Examiner* — Anne Mazzara
(74) *Attorney, Agent, or Firm* — Global IP Counselors, LLP

(57) ABSTRACT

A vehicle control system of the electrically driven vehicle, wherein the engagement element slip process is carried out for the slipping of the transmission engagement element on the basis of the detection by the detecting section; and the control system has a clutch torque control section that is programmed to work as follows: during the engagement element slip process, the target motor/generator torque, which is increased from the drive torque of the motor/generator by a clutch slip accelerating torque portion for accelerating the slipping of the drive transmission engagement element for the drive torque of the motor/generator, is output from the motor/generator. In addition, when the preset slip accelerating torque suppression condition is met, the torque control for decreasing the drive torque of the motor/generator is carried out.

19 Claims, 14 Drawing Sheets

(56) References Cited

U.S. PATENT DOCUMENTS

| | | |
|---|---|---|
| 2007/0056783 A1 | 3/2007 | Joe et al. |
| 2007/0080005 A1* | 4/2007 | Joe .............................. 180/65.2 |
| 2010/0030438 A1* | 2/2010 | Brattberg et al. ............... 701/67 |

FOREIGN PATENT DOCUMENTS

| | | |
|---|---|---|
| JP | 2009-090898 A | 4/2009 |
| JP | 2010-111144 A | 5/2010 |
| JP | 2010-167803 A | 8/2010 |

* cited by examiner

| DRIVE WHEEL SLIP CONDITION ESTABLISHMENT FLAG FS | ON | | OFF | | | | IRRELEVANT TO DRIVE WHEEL SLIP CONDITION ESTABLISHMENT FLAG FS | | | |
|---|---|---|---|---|---|---|---|---|---|---|
| CURRENT GEAR-SHIFT STEP | 1 | 2 | 1 | 2 | 3 | 4 | 5 | 6 | 7 | R |
| CL SLIP ACCELERATING TORQUE TT TABLE (NM) | T12 | T22 | T1 | T2 | T3 | T4 | T5 | T6 | T7 | Tr |
| INCREASE SLOPE Ktr | Ktr12 | Ktr22 | Ktr1 | Ktr2 | Ktr3 | Ktr4 | Ktr5 | Ktr6 | Ktr7 | Ktrr |

VEHICLE CONTROL SYSTEM FOR ELECTRICALLY DRIVEN VEHICLE

CROSS-REFERENCE TO RELATED APPLICATIONS

This application is a U.S. National stage of International Application No. PCT/JP2011/074343, filed Oct. 21, 2011. This application claims priority to Japanese Patent Application No. 2010-240335, filed with Japan Patent Office on Oct. 27, 2010.

BACKGROUND

1. Field of the Invention

The present invention relates to a control system of an electrically driven vehicle, wherein a drive transmission engagement element is included between the motor/generator as the driving source and the drive wheel, and the drive transmission engagement element is made to slip corresponding to the running state of the vehicle.

2. Background Information

In the prior art, the control system of the electrically driven vehicle having a drive transmission engagement element included between the motor/generator as the driving source and the drive wheel is adopted as the control system of the so-called hybrid vehicle (for example, see Japanese Laid Open Patent Application No. 2007-69790). For the control system of the hybrid vehicle in the prior art, a mode switching engagement element is arranged between the engine of the driving system and the motor/generator, and a drive transmission engagement element is arranged between the motor/generator and the drive wheel. According to the prior art, when mode transition is made from the EV mode (the electrically driven vehicle mode) when the mode switching engagement element is disengaged while the drive transmission engagement element is engaged with the HEV mode (the hybrid vehicle mode) and the two engagement elements are engaged, the mode switching engagement element is engaged after the drive transmission engagement element is made to slip, and the engine start is controlled by an engine start controller.

SUMMARY

In the control system of the hybrid vehicle of the prior art, when the vehicle is started together with the mode transition from the EV mode to the HEV mode, and when the vehicle stops, starts, decelerates, etc. in the HEV mode running, the drive transmission engagement element is made to slip.

In order to carry out the slip of the drive transmission engagement element quickly, the drive torque needed for starting the engine is preferably added to the drive torque of the motor/generator, so that the drive torque increases the accelerating slip of the drive transmission engagement element. In the present specification, the increased drive torque will be called the clutch slip accelerating torque.

However, when the clutch slip accelerating torque is increased to a higher level as described above, problems take place in the following running state of the vehicle. When the driver steps down on the accelerator pedal on a low-$\mu$ road or the like, as the drive torque becomes excessive with respect to the road surface $\mu$, slipping of the drive wheel occurs. In order to suppress this phenomenon, control should be carried out to decrease the drive torque (hereinafter to be referred to as the TCS control). However, during the TCS control, when there is a requirement for controlling the slipping of the drive transmission engagement element, such as in the case of determining the engine start, etc., although the drive torque is decreased under the TCS control, the clutch slip accelerating torque is nevertheless added to the drive torque of the motor/generator. In such cases, the drive torque becomes excessive, so that the vehicle performance may become erratic, or the acceleration feeling may become insufficient.

The purpose of the present invention is to solve the problems described above by providing a control system of the electrically driven vehicle that can suppress the drive torque of the drive wheel so that the drive torque does not increase too much when the drive transmission engagement element is made to slip.

In order to realize the purpose described above, according to the control system of the electrically driven vehicle of the present invention, the clutch torque control section works as follows: in the case of the engagement element slip process, the target motor/generator torque, which is increased from the drive torque of the motor/generator the clutch slip accelerating torque portion for accelerating the slipping of the drive transmission element, is output from the motor/generator. In addition, when the slip accelerating torque suppression condition is met, the drive torque of the motor/generator is suppressed to be lower than that when such a condition is not met.

When the drive wheel slip condition determining section determines that the condition is met, as the engagement element slip process is carried out, the target motor/generator torque output to the motor/generator is suppressed to lower than that when the drive wheel slip condition determining section determines that the condition is not met. As a result, it is possible to suppress the drive torque of the drive wheel from becoming too high with respect to the road surface $\mu$.

BRIEF DESCRIPTIONS OF THE DRAWINGS

FIG. 10 is a diagram illustrating the characteristics indicating the CL slip accelerating torque TT and the increase slope Ktr set corresponding to the gear-shift step in the first embodiment.

DETAILED DESCRIPTION OF EMBODIMENTS

In the following, the optimum embodiment of the control system of the electrically driven vehicle according to the present invention will be explained with reference to the first embodiment illustrated with the drawings.

Embodiment 1

Figure 1:
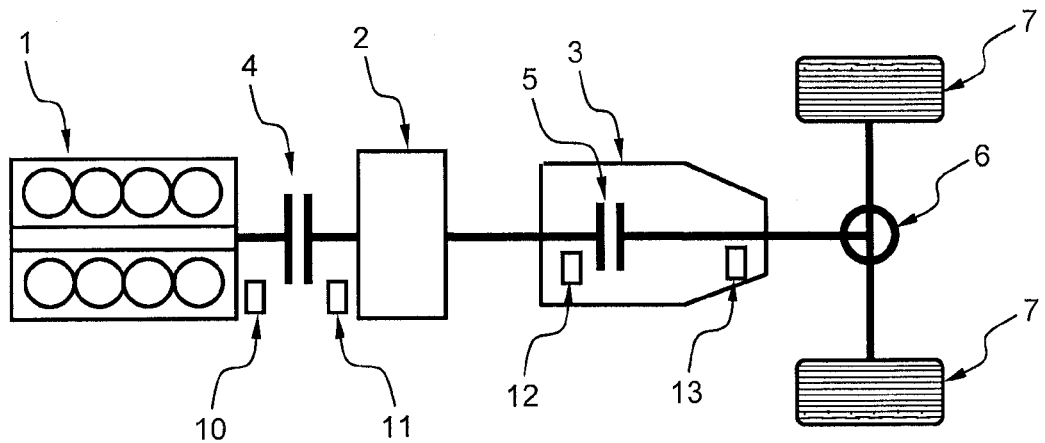
FIG. 1 is a power train configuration diagram illustrating the power train of the hybrid vehicle wherein the control system of the hybrid vehicle in the first embodiment of the control system of the electrically driven vehicle of the present invention is adopted.

First, the configuration will be explained. FIG. 1 is a power train configuration diagram illustrating the power train of the hybrid vehicle wherein the control system of the hybrid vehicle in the first embodiment of the control system of the electrically driven vehicle of the present invention is adopted. In the following, the configuration of the power train will be explained with reference to FIG. 1.

As shown in FIG. 1, the hybrid vehicle wherein the first embodiment is adopted comprises an engine 1, a motor/generator 2, an automatic transmission 3, a first clutch 4 as the mode switching engagement element, a second clutch 5 as the drive transmission engagement element, a differential gear unit 6 and drive wheels 7, 7.

The hybrid vehicle wherein the first embodiment is adopted has a power train configuration comprising an engine, as well as one motor and two clutches. For this hybrid vehicle, on the basis of the power train configuration, the running modes include an HEV mode (the hybrid vehicle mode) due to the engagement of the first clutch 4 and the EV mode (the electrically driven vehicle mode) due to the disengagement of the first clutch 4.

For the engine 1 described above, the output shaft and the input shaft of the motor/generator 2 (abbreviated as MG) are connected to each other via a torque capacity variable first clutch 4 (abbreviated as CL 1). The motor/generator 2 described above has the output shaft and the input shaft of the automatic transmission 3 (abbreviated as AT) connected to each other. The automatic transmission 3 described above has the output shaft connected to the drive wheels 7, 7 via the differential gear unit 6. The automatic transmission 3 is a gear-shift step transmission that shift gears to various steps corresponding to the vehicle speed and the accelerator position, etc. In the first embodiment, a gear-shift step transmission having gear-shift steps including 7 forward gear-shift steps and 1 backwards gear-shift step is in use.

The second clutch 5 (abbreviated as CL2) uses one of the engagement elements with the torque capacity variable clutch/brake that carries out power transmission in the transmission during difficult gear-shift steps corresponding to the shift state of the automatic transmission 3. As a result, for the automatic transmission 3, the power of the engine 1 input via the first clutch 4 and the power input from the motor/generator 2 are synthesized and output to the drive wheels 7, 7.

For example, the first clutch 4 and the second clutch 5 may be made of the wet-type clutches that allow for continuous control of the hydraulic fluid flow rate and the hydraulic pressure by means of a proportional solenoid. The power train system has two operation modes corresponding to the connection states of the first clutch 4. In the disengaged state of the first clutch 4, the power train system is in the "EV mode" when the vehicle runs with only the power of the motor/generator 2; in the engaged state of the first clutch 4, the power train system is in the "HEV mode" when the vehicle runs with both the power of the engine 1 and the power of the motor/generator 2.

An engine speed sensor 10, an MG rotational speed sensor 11, and an AT output rotational speed sensor 13 are arranged in the power train. Here, the engine speed sensor 10 detects the rotational speed of the engine 1, the MG rotation sensor 11 detects the rotational speed of the motor/generator 2, and the AT output rotation sensor 13 detects the input shaft rotational speed of the automatic transmission 3.

Figure 2:
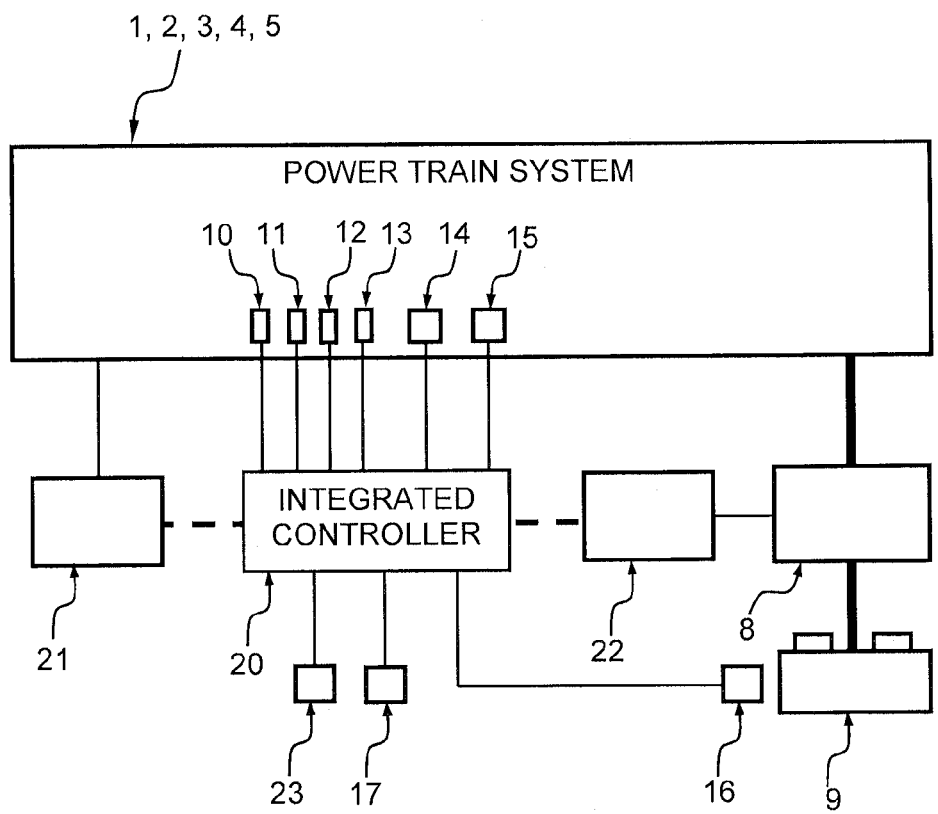
FIG. 2 is a diagram illustrating the control system of the hybrid vehicle wherein the control system of the first embodiment is adopted.

FIG. 2 is a diagram illustrating the control system of the hybrid vehicle wherein the controller of the first embodiment is adopted. In the following, the configuration of the control system will be explained with reference to FIG. 2.

As shown in FIG. 2, this control system comprises an integrated controller 20, an engine controller 21, a motor controller 22, an inverter 8, a battery 9, a solenoid valve 14, a solenoid valve 15, an accelerator pedal position opening sensor 17, a brake hydraulic pressure sensor 23, and an SOC sensor 16.

The integrated controller 20 described above provides integrated control for the operation points of the structural elements of the power train system. Corresponding to an accelerator position opening APO, a battery state of charge SOC, and a vehicle speed VSP (proportional to the rotational speed of the output shaft of the automatic transmission), the integrated controller 20 selects the driving mode that can realize the drive torque desired by the driver. Then, the target MG torque or the target MG rotational speed is provided to the motor controller 22; the target engine torque is provided to the engine controller 21, and the driving signal is provided to the solenoid valves 14, 15.

The engine controller 21 controls the engine 1. The motor controller 22 controls the motor/generator 2. The inverter 8 drives the motor/generator 2. The battery 9 stores the electric energy. The solenoid valve 14 controls the hydraulic pressure of the first clutch 4. The solenoid valve 15 controls the hydraulic pressure of the second clutch 5. The accelerator pedal position opening sensor 17 detects the accelerator position opening (APO). The brake hydraulic pressure sensor 23 detects the brake hydraulic pressure (BPS). The SOC sensor 16 detects the state of charge of the battery 9.

Figure 3:
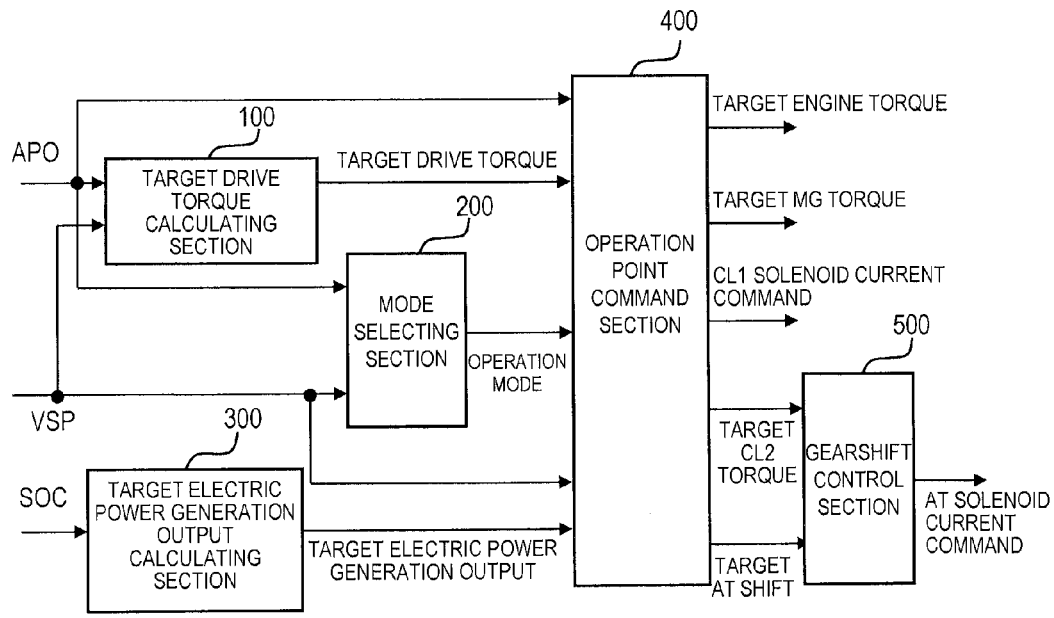
FIG. 3 is a block diagram illustrating the operation showing the integrated controller in the control system of the first embodiment.

FIG. 3 is a block diagram illustrating the operation of the integrated controller 20 in the first embodiment. In the following, the configuration of the integrated controller 20 will be explained with reference to FIG. 3. As shown in FIG. 3, the integrated controller 20 described above comprises a target drive torque calculating section 100, a mode selecting section 200, a target electric power generation output calculating section 300, an operation point instruction section 400, and a gear-shift control section 500.

Figures 4A, 4B:
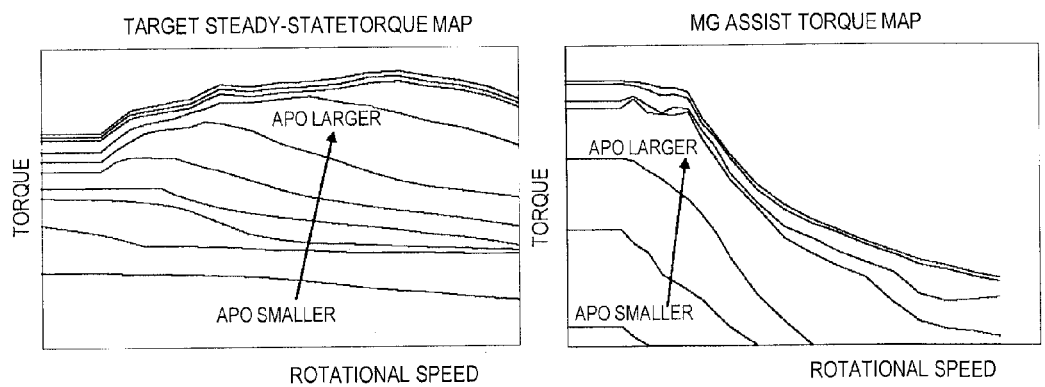
FIG. 4A is a map diagram illustrating the target steady-state torque map adopted in the control system of the first embodiment.
FIG. 4B is a map diagram illustrating the MG assist torque map adopted in the control system of the first embodiment.

The target drive torque calculating section 100 uses the target steady-state torque map shown in FIG. 4A and the MG assist torque map shown in FIG. 4B to calculate the target steady-state drive torque and the MG assist torque from the accelerator position opening APO and the vehicle speed VSP.

Figure 5:
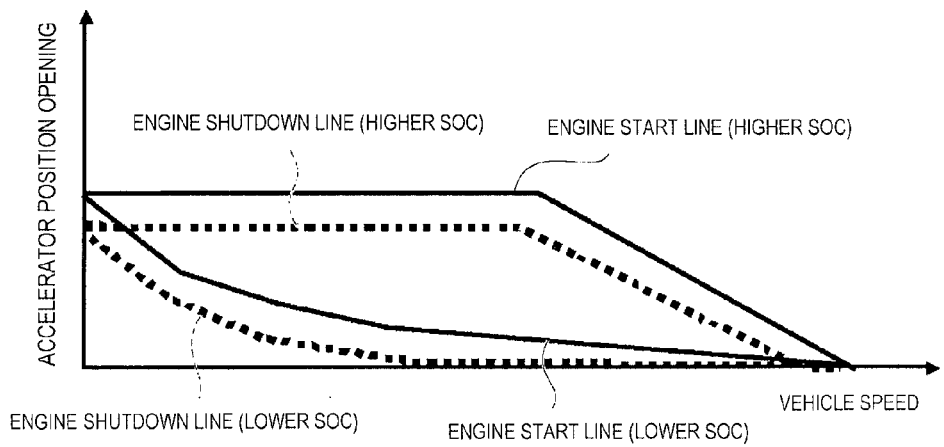
FIG. 5 is a map diagram illustrating the engine start/shutdown line map adopted in the control system of the first embodiment.

The mode selecting section 200 described above uses the engine start/shutdown line map set by the accelerator position at each vehicle speed shown in FIG. 5 to calculate the operation mode (the HEV mode and the EV mode). The engine start line and the engine shutdown line are set as characteristics that have the accelerator position opening APO decrease to be smaller as the battery SOC decreases as the typical characteristics of the engine start line (high SOC, low SOC) and the engine shutdown line (high SOC, low SOC). With the mode selecting section 200, together with the transition from the EV mode to the HEV mode, the engine start process is carried out, and the engine 1 is started.

Here, the engine start process is carried out as follows. That is, at the time when the accelerator position opening APO crosses the engine start line shown in FIG. 5 in the EV mode state, the torque capacity of the second clutch 5 is controlled so that the second clutch 5 is made to slip in the semi-clutch state. Then, after a determination is made that the second clutch 5 starts slipping, the engagement of the first clutch 4 is started, and the engine rotational speed is increased. Then, once the engine rotational speed reaches the level at which an initial explosion can take place, the engine 1 is turned on for the combustion operation; when the motor rotational speed approaches the engine rotational speed, the first clutch 4 is fully engaged. Then, the second clutch 5 is locked up, and the transition is made to the HEV mode.

Figure 6:
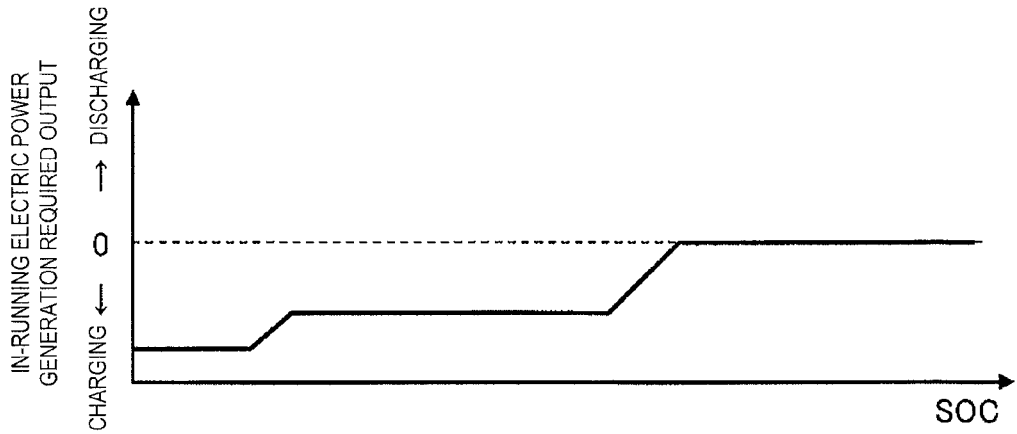
FIG. 6 is a characteristics diagram illustrating the in-running required electric power generation output versus the battery SOC adopted in the control system of the first embodiment.
Figure 7:
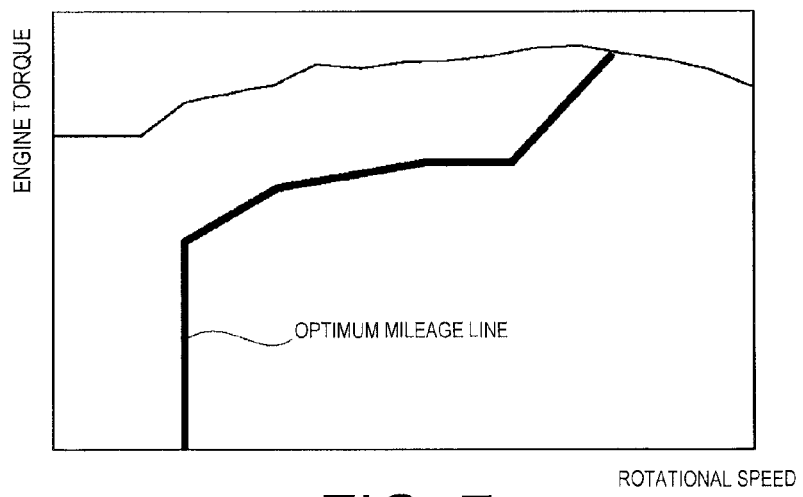
FIG. 7 is a characteristics diagram illustrating the optimum mileage line of the engine wherein the control system of the first embodiment is adopted.

The target electric power generation output calculating section 300 uses the in-running electric power generation required output map shown in FIG. 6 to calculate the target electric power generation output from the battery SOC. Also, the output needed for increasing the engine torque from the current operation point to the optimum mileage line shown in FIG. 7 is calculated and compared with the target electric power generation output described above, and the lower output is added as the required output to the engine output.

Now, the discussion returns to FIG. 3. The accelerator position opening APO, the target steady-state torque, the MG assist torque, the target mode, the vehicle speed VSP, and the required electric power generation output are input to the operation point instruction section 400 described above. Then, with these pieces of input information taken as the operation point arrival target, the transient target engine torque, the target MG torque, the target CL2 torque capacity, the target gear ratio, and the CL 1 solenoid current instruction are calculated.

Figure 8:
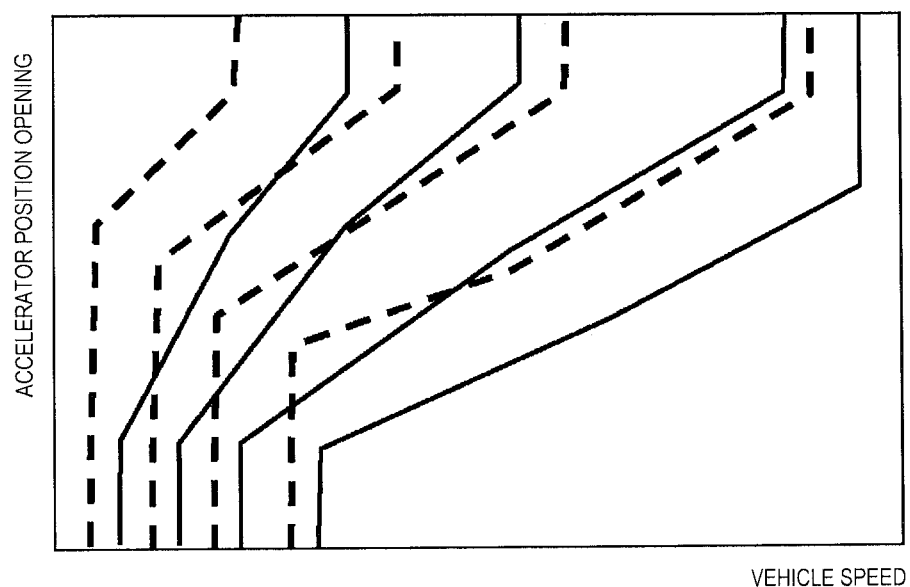
FIG. 8 is a gear-shift map diagram illustrating an example of the gear-shift line in the automatic transmission adopted in the first embodiment.

Based on the target CL2 torque capacity and the target gear ratio, the gear-shift control section 500 described above drives and controls the solenoid valves in the automatic transmission 3 so that the capacity and gear ratio described above are reached. FIG. 8 is a diagram illustrating an example of the gear-shift line map adopted in the gear-shift control. Based on the vehicle speed VSP and the accelerator position opening APO, a determination is made regarding the next gear-shift step from the current gear-shift step; if there is a request for the gear-shift, the gear-shift clutch is controlled to make the gear-shift.

Figure 9:
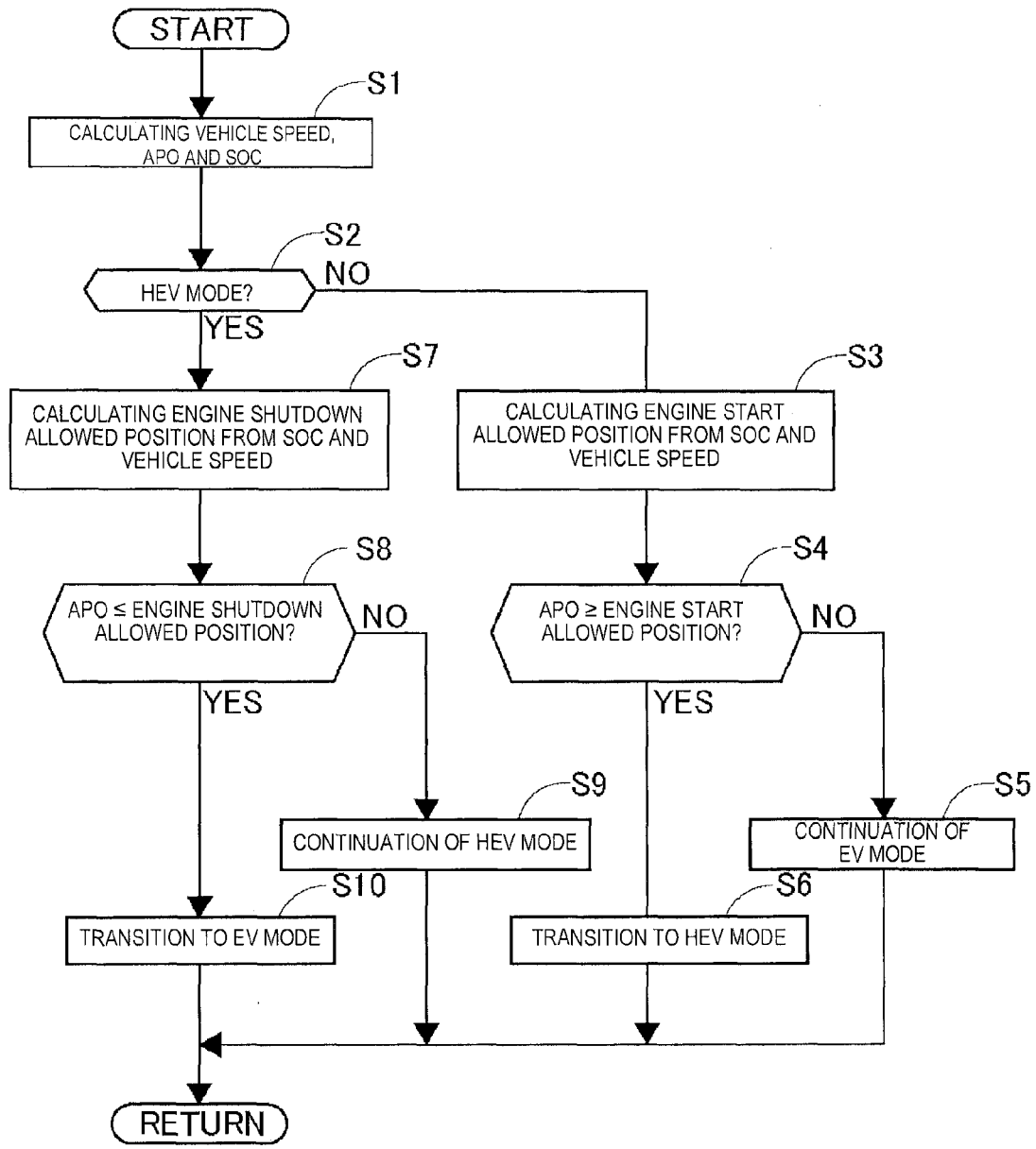
FIG. 9 is a flowchart illustrating the flow of the mode transition control process carried out by the integrated controller in the first embodiment.

FIG. 9 shows the configuration and the flow of the integrated control operation process carried out by the integrated controller 20 in the first embodiment. In the following, the various steps shown in FIG. 9 will be explained.

In step S1, the vehicle speed VSP, the accelerator position opening APO and the battery SOC are calculated. The operation then goes to step S2. In step S2, as a continuation of the calculation of the input information in step S1, a determination is made regarding whether the current selected running mode is the HEV mode. If the determination result is YES (when the HEV mode is selected), the operation goes to step S7. If NO (when the EV mode is selected), the operation goes to step S3. Here, the running mode is set at the EV mode when the initial setting is made at the time of starting the vehicle.

In step S3, as a continuation of the determination of the selection of the EV mode in step S2, on the basis of the battery SOC, the engine start line characteristics shown in FIG. 5 are determined, and, on the basis of the determined engine start line characteristics and the vehicle speed VSP, the engine start allowed position is calculated, and the operation then goes to step S4.

In step S4, as a continuation of the calculation of the engine start allowed position in step S3, a determination is made regarding whether the accelerator position opening APO is over the engine start allowed position. If the result of the determination is YES (the APO≥the engine start allowed position), the operation goes to step S6. If NO (the APO<the engine start allowed position), the operation goes to step S5.

In step S5, as a continuation of the determination of the APO being less than the engine start allowed position in step S4, the EV mode is maintained, and the operation goes to RETURN. In step S6, as a continuation of the determination of the APO being greater than or equal to the engine start allowed position in step S4, mode transition is carried out from the EV mode via the engine start control to the HEV mode, and the operation then goes to RETURN.

In step S7, as a continuation of the determination of the selection of the HEV mode in step S2, the engine shutdown line characteristics shown in FIG. 5 are determined according to the battery SOC, and, on the basis of the determined engine shutdown line characteristics and the vehicle speed VSP, the engine shutdown allowed position is calculated, and the operation then goes to step S8.

In step S8, as a continuation of the calculation of the engine shutdown allowed position in step S7, a determination is made regarding whether the accelerator position opening APO is below the calculated engine shutdown allowed position. If the result of the determination is YES (the APO≤the engine shutdown allowed position), the operation goes to step S10. If NO (the APO>the engine shutdown allowed position), the operation goes to step S9.

In step S9, as a continuation of the determination of the APO being greater than the engine shutdown allowed position in step S8, the HEV mode is maintained, and the operation then goes to RETURN. In step S10, as a continuation of the determination of the APO being less than or equal to the engine shutdown allowed position in step S8, the transition from the HEV mode to the EV mode is started, and the operation then goes to RETURN.

In the following, the torque control of the second clutch 5 in the engine start control together with the transition to the HEV mode in step S6 will be explained. When the engine starts, the integrated controller 20 carries out the engagement element slip process for making the second clutch 5 slip with respect to the target MG torque. In the engagement element slip process, the torque control is carried out by further increasing the clutch slip accelerating torque portion to the drive torque obtained by adding the engine start torque to the target MG torque set corresponding to the accelerator position opening APO, the battery electrical charge storage rate SOC, and the vehicle speed VSP. Here, according to this first embodiment, as the torque control for increasing the clutch slip accelerating torque portion with respect to the drive torque, the drive torque is increased by adding the clutch slip accelerating torque (hereinafter to be referred to as the CL slip accelerating torque) TT. Here, according to the first embodiment, in the added torque control, the value of the CL slip accelerating torque TT and the slope Ktr of the increase are set. In the following, the process of the added torque control will be explained.

In the engine start state, for the motor/generator MG, the engine start torque is added to the target MG torque set corresponding to the accelerator position opening APO, the battery electrical charge storage rate SOC and the vehicle speed VSP, and the added torque is output. In addition, according to the first embodiment, when the engine starts, the CL slip accelerating torque TT for accelerating the slip of the second clutch 5 is added to the target MG torque of the motor/generator MG. In the first embodiment, as shown in FIG. 10, the CL slip accelerating torque TT is set independently corresponding to each gear-shift step among the 7 forward gear-shift steps and the 1 backwards gear-shift step represented by R (T1 through T7, Tr).

For the values of T1 through T7, Tr of the CL slip accelerating torque TT, the value of T1 for the first low-speed forward gear-shift step, the value of T2 for the second speed and the value of Tr for the backwards gear-shift step are set to be smaller than the values T3 through T7 as the remaining gear-shift steps. That is, the values T1 and T2 adopted when the drive wheel slip condition establishment flag Fs is OFF in the forward gear-shift step 1 and the forward gear-shift step 2 are set with the following relationship with the values T3 through T7 for the forward gear-shift step 3 through the forward gear-shift step 7 and Tr for the backwards gear-shift step for both ON and OFF of the drive wheel slip condition establishment flag Fs: T1=Tr<T2 through T7. In addition, the drive wheel slip condition establishment flag Fs is ON when the drive wheels 7, 7 may slip, and this flag is OFF otherwise. ON and OFF of the drive wheel slip condition establishment flag Fs correspond to yes/no of the establishment of the slip accelerating torque suppression condition, and they will be explained in detail later.

More specifically, according to the first embodiment, the values T2 through T7 of the CL slip accelerating torque TT corresponding to the forward gear-shift steps 2 through 7 are set at the same value. On the other hand, the values T1, Tr of the CL slip accelerating torque TT for the forward gear-shift step 1 and backwards gear-shift step 1 are set at 60% or a nearby value of T2 through T7 (in the range of T2×approximately 0.5 through 0.7).

In addition, according to this first embodiment, for the CL slip accelerating torque TT adopted for the forward gear-shift step 1 and the forward gear-shift step 2, the values T1, T2 when the drive wheel slip condition establishment flag Fs is OFF and the values T12, T22 when the drive wheel slip condition establishment flag Fs is ON are set. The values T12, T22 of the CL slip accelerating torque TT adopted when the drive wheel slip condition establishment flag Fs is ON are set at values smaller than those adopted when Fs is OFF. That is, according to the first embodiment, the T12, T22 of the CL slip accelerating torque TT are set so that T12<T1 and T22<T2.

More specifically, T12 is set to equal to T1×0.7 or an similar value (approximately the range of T1×0.6 through 0.8). Similarly, T22 is set to equal to T2×0.7 or a similar value (approximately the range of T2×0.6 through 0.8).

Also, according to the first embodiment, as shown in the FIG., the increase slope Ktr when the CL slip accelerating torque TT is added is set independently corresponding to each gear-shift step. According to the first embodiment, the increase slope Ktr for the forward gear-shift step 1 and the forward gear-shift step 2 is set at two types of values corresponding to ON/OFF of the drive wheel slip condition establishment flag Fs. When Fs=ON, the increase slopes Ktr12 and Ktr22 are set to be milder than the increase slopes Ktr1, Ktr2 when Fs=OFF (see FIG. 12).

The values T12, T22 of the CL slip accelerating torque TT and the increase slopes Ktr12, Ktr22 when the drive wheel slip condition establishment flag Fs are ON are preferably set on the basis of the experiments performed on the actual vehicle or by simulation. That is, for a low-μ road or other road surfaces prone to the slip of the drive wheels, the values and the slopes are set at the optimum values that can accelerate the slip of the second clutch 5 with little slip of the drive wheels even when the CL slip accelerating torque TT is added to the target MG torque. Also, the slip of the second clutch 5 is accelerated within the range of the drive wheel slip free of significant degradation in the drivability even when the drive wheel slip takes place.

Figure 11:
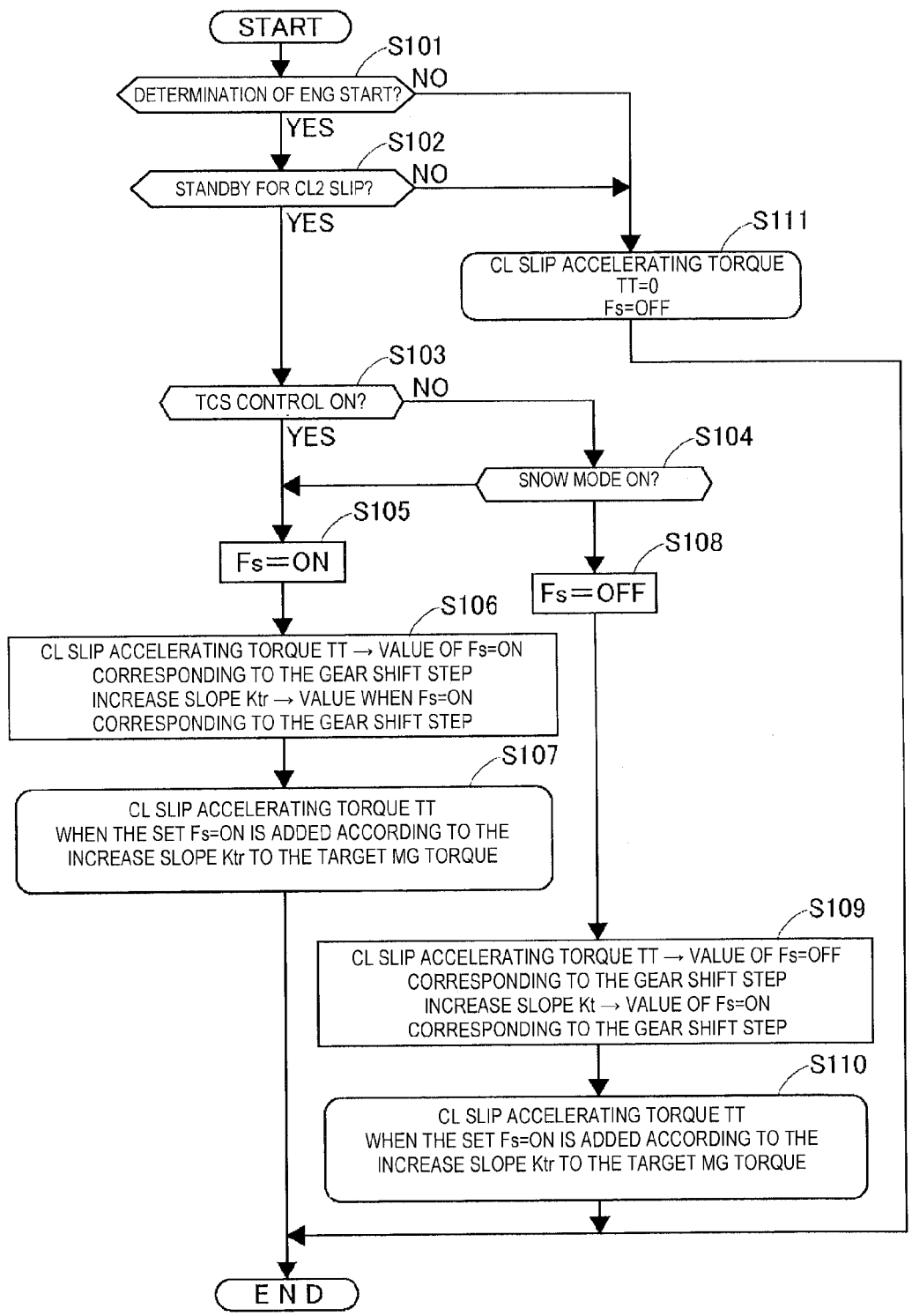
FIG. 11 is a flow chart illustrating the flow of the process for the added torque control as the torque control for the control system of the first embodiment.

In the following, on the basis of the flow chart shown in FIG. 11, the flow of the added torque control that sets the CL slip accelerating torque TT and the increase slope Ktr described above will be explained. In step S101, a determination is made regarding whether the engine start determination is YES. When the engine starts (YES), the operation goes to step S102. On the other hand, when the engine does not start (NO), the operation goes to step S111.

In step S102, a determination is made regarding whether the current state is the slip standby state of the second clutch 5. If the determination result is the slip standby state (YES), the operation goes to step S103; if the determination result is not the slip standby state (NO), the operation goes to step S111. Here, the slip standby refers to the following state: when the engine 1 starts, as the second clutch 5 starts slipping, the first clutch 4 is engaged, and the engine rotational speed is increased to make the initial explosion; as the first clutch 4 is engaged, the state is the standby state until the second clutch 5 actually starts slipping. According to the first embodiment, during the period of the slip standby, the CL slip accelerating torque TT is added.

In step S103, a determination is made regarding whether the TCS control is ON. If the TCS control is ON (YES), the operation goes to step S105, and, if the TCS control is OFF (NO), the operation goes to step S104. In step S104 that is reached when the TCS control is OFF, in the gear-shift control of the automatic transmission 3, a determination is made regarding whether the snow mode is ON. If the snow mode is ON (YES), the operation goes to step S105, and, if the snow mode is OFF (NO), the operation goes to step S108.

Here, when the TCS control is ON in step S103, the TCS control for suppressing the drive wheel slip is carried out. Here, as the snow mode, the running mode is set so that the shift characteristics of the automatic transmission 3 (such as the gear-shift step 2 start and the shift change faster than the normal case), the driving characteristics of the engine 1, etc. are set at the characteristics that best fit the snow running as slip of the drive wheels can hardly take place. The driver can manipulate the snow mode switch to set this mode. According to this first embodiment, an example of meeting the slip accelerating torque suppression condition refers to the case in which the TCS control is ON and/or snow mode is ON. When the TCS control is ON and/or the snow mode is ON, the drive wheel slip condition establishment flag Fs is set ON. On the other hand, when both of them do not take place, the drive wheel slip condition establishment flag Fs is set to OFF. According to the first embodiment, the portion for determining in step S103 and step S104 as the portion for carrying out the determination of ON/OFF of the drive wheel slip condition establishment flag Fs corresponds to the drive wheel slip condition determining section.

When the determination result for either step S103 or step S104 is YES, in step S105 when the condition with the possibility of the slip of the drive wheels 7, 7 is met, the drive wheel slip condition establishment flag Fs is set ON, and the operation then goes to step S106.

In step S106, after setting the CL slip accelerating torque TT and the increase slope Ktr when Fs is ON corresponding to the current gear-shift step, the operation goes to step S107. That is, as the CL slip accelerating torque TT, corresponding to the current gear-shift step, any of the T12, T22, T3 through T7 and Tr shown in FIG. 10 is selected; at the same time, the increase slope Ktr adopted when Fs is ON is adopted as the increase slope Ktr when an increase is made to the CL slip accelerating torque TT.

In step S107, the CL slip accelerating torque TT when the set Fs is ON is added to the target MG torque to increase the drive torque according to the set increase slope Ktr. In this case, as described above, the engine start torque is also added to the target MG torque. On the other hand, in step S108 that is reached when the determination result is NO and when the condition with the possibility of the slip of the drive wheels 7, 7 is not met in both step S103 and step S104, the drive wheel slip condition establishment flag Fs is set to OFF, and the operation goes to step S109.

In step S109, after setting of the CL slip accelerating torque TT and the increase slope Ktr when Fs is OFF corresponding to the current gear-shift step, the operation goes to step S110. That is, in step S109, as the CL slip accelerating torque TT, corresponding to the current gear-shift step, any of the T1 through T7 and Tr shown in FIG. 10 is selected; at the same time, the increase slope Ktr when Fs is OFF is adopted as the increase slope Ktr when an increase is made to the CL slip accelerating torque TT.

In step S110, the drive torque is increased by adding the CL slip accelerating torque TT at the set state of Fs at OFF to the target MG torque according to the set increase slope Ktr. In this case, the engine start torque is also added to the target MG torque as described above. On the other hand, in step S111 that is reached when the engine is not started (NO) in step S101 and is not in the slip standby state (NO) in step S102, while the CL slip accelerating torque TT is set to equal to 0, the drive wheel slip condition establishment flag Fs is set to OFF.

In the following, the operation will be explained. First, the "object of the comparative example" will be explained. Then, the operation of the control system of the hybrid vehicle in the first embodiment will be explained.

When the engine starts together with the mode transition from the EV mode to the HEV mode, in order to start the engine quickly, shortening the time until the second clutch slips is necessary. For this purpose, the drive torque of the motor/generator is preferably obtained by adding the CL slip accelerating torque, which is the drive torque for accelerating the slip of the second clutch, to the drive torque needed for start of the engine.

In addition, when running on a low-u road, if the drive torque of the drive wheels is too high, the drive wheels slip and the behavior of the vehicle is disturbed. Consequently, the TCS control should be carried out to decrease the drive torque to suppress this phenomenon. However, when there is a determination of starting the engine during the TCS control, irrelevant to the decrease in the drive torque due to the TCS control, as the CL slip accelerating torque is added to the drive torque of the motor/generator for accelerating the slip of the second clutch, the drive torque at the drive wheels with respect to the road surface µ becomes excessive, the vehicle behavior becomes unstable, and the acceleration feeling becomes insufficient. On the other hand, when the addition of the CL slip accelerating torque is not carried out, the time for starting the engine becomes longer, and the engine start performance may degrade as the second clutch cannot be set in the slip state. In addition, when such an engine start cannot be carried out, the battery may become insufficient. In particular, this phenomenon becomes more significant when the drive torque decreases due to the TCS control. Also, when the engine start is carried out without making the second clutch slip, there is a high possibility for the drive wheels to slip.

In the following, the operation of the first embodiment will be explained. In the case of running in the EV mode, as the driver steps down on the accelerator pedal and the accelerator position opening APO crosses the engine start line as shown in FIG. 5, the running mode makes the transition to the HEV mode, and the engine start processes are carried out.

In this case, the torque capacity of the second clutch 5 is controlled so that the second clutch 5 is made to slip in the semi-clutch state; after a determination is made that the second clutch 5 starts slipping, the engagement of the first clutch 4 starts, and the engine rotational speed is increased. Then, as the engine rotational speed reaches the rotational speed that allows the initial explosion, the engine 1 is set in the combustion operation. When the motor rotational speed approaches the engine rotational speed, the first clutch 4 is fully engaged. Then, the second clutch 5 is locked up, and the mode makes the transition to the HEV mode.

When the engine starts, as the slip of the second clutch 5 is accelerated, the CL slip accelerating torque TT is added to the drive torque of the motor/generator MG, and the torque is increased by the clutch slip accelerating torque portion for making the second clutch 5 slip. In this case, during the period of standby for slipping to take place for the second clutch 5 after the beginning of the engine start control, while the TCS control is not turned on, the automatic transmission 3 does not go into the snow mode. In this way, when the slip condition is not met, the CL slip accelerating torque TT is for the drive wheel slip condition establishment flag Fs to be OFF.

Consequently, compared with the case in which an increase in the drive torque by adding the CL slip accelerating torque TT is not carried out, the generation of the slip for the second clutch 5 is accelerated, the standby time for the slip of the second clutch 5 becomes shorter, and it is possible to start the engine in a shorter amount of time.

Figure 12:
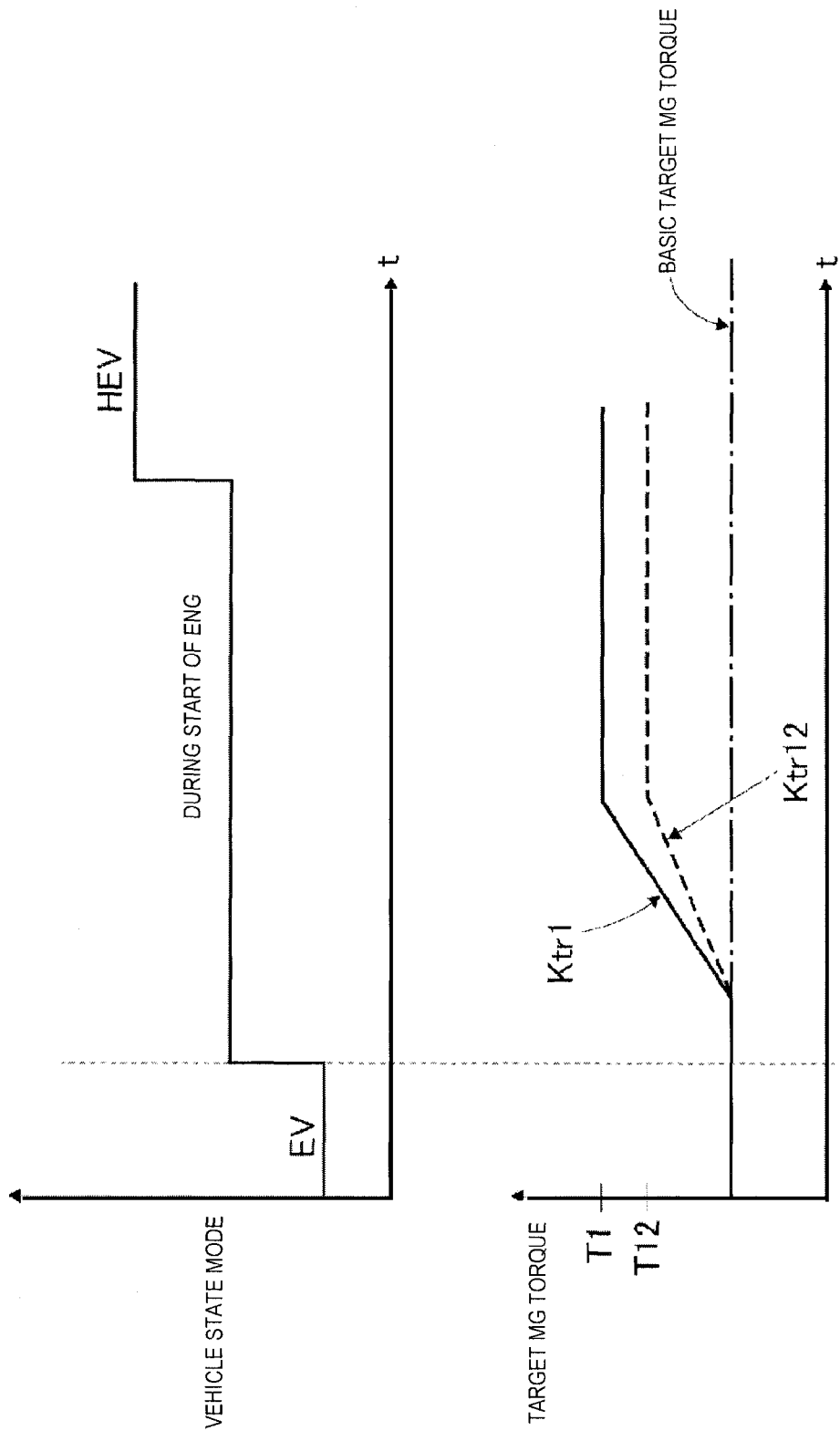
FIG. 12 is a time chart illustrating an example of the variation in the vehicle state mode and the target MG torque when the added torque control is carried out when starting the engine with the control system of the first embodiment.

FIG. 12 is a diagram illustrating an example of the change in the vehicle state mode and the target MG in the case of the forward gear-shift step 1. Here, the solid line shows the case when the Fs is OFF as described above. In this case, the CL slip accelerating torque TT with the value T1 is added to the target MG torque at the increase slope Ktr1.

On the other hand, when the vehicle runs on a low-µ road or the like, as the snow mode switch is turned ON, or as the accelerator pedal is compressed, slipping of the drive wheels takes place. In order to suppress this, the TCS control is carried out; when the drive wheel slip condition establishment flag Fs is ON, the following operation is carried out.

That is, when the drive wheel slip condition establishment flag Fs is ON, in the forward gear-shift step 1 described above, as the CL slip accelerating torque TT, the value T12 of the increase slope Ktr12 is added.

As shown by the broken line in FIG. 12, the value T12 is set at a value smaller than the normally adopted value T1. In addition, the increase slope Ktr12 is also milder than the normally adopted increase slope Ktr1. Consequently, when the vehicle is in the TCS control and runs on a low-μ road, and when the engine starts, even when the CL slip accelerating torque TT is added, it is still possible to suppress the phenomenon that the drive torque of the motor/generator 2 becomes too large so that slipping takes place in the drive wheels 7, 7 or the slipping increases.

Figure 13:
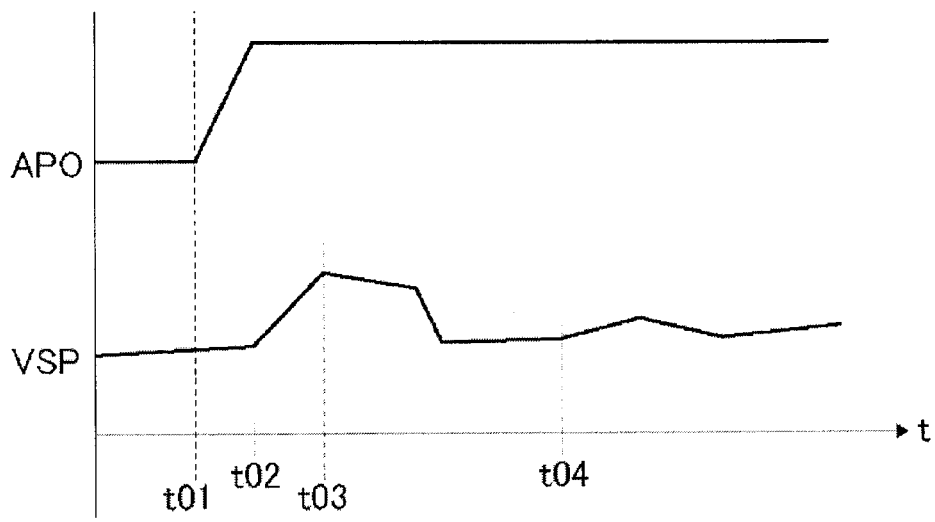
FIG. 13 is a time chart illustrating an example of the operation of the control system in the first embodiment.

The time chart in FIG. 13 shows the variation in the accelerator position opening APO and the vehicle speed VSP (the drive wheel speed) when the engine start control is carried out together with the mode transition from the low-speed running in the EV mode to the HEV mode as the driver forcibly steps down on the accelerator pedal on a low-μ road. In this example, at the time t01, forcible compression of the accelerator pedal starts. Then, at the time t02, the drive wheel slip takes place, and the vehicle speed VSP increases drastically. In addition, corresponding to the rapid increase in the vehicle speed VSP, the TCS control is started (t03), and the vehicle speed VSP decreases.

At the same time as the operation described above, corresponding to the compression of the accelerator pedal, the engine start control is carried out for the transition to the HEV mode. At the time t04, the CL slip accelerating torque TT is added to the target motor torque. In the case of the first embodiment, as the CL slip accelerating torque TT, the value T12 is lower than the value when the drive wheel slip condition establishment flag Fs at OFF is used; at the same time, the increase slope Ktr is also suppressed to a milder level. Consequently, the increase in the vehicle speed VSP (the drive wheel speed) is suppressed, and no slipping of the drive wheel takes place.

In the following, the effects will be explained. For the control system of the hybrid vehicle in the first embodiment, the following listed effects can be realized.

(1) The control system of the hybrid vehicle of the first embodiment comprises a motor/generator 2, which is arranged in the driving system of the drive wheels 7, 7 and which carries out the driving of the drive wheels 7, 7 by powering and carries out the electric power generation by regeneration, a second clutch 5 arranged between the motor/generator 2 and the drive wheels 7, 7, a detecting section (10 through 17 and 23) that detect the drive state and the idling state, and an integrated controller 20 as a clutch torque control section that carries out the torque control as follows: on the basis of the detection by the detecting section, the integrated controller carries out the engagement element slip process so that the second clutch 5 is made to slip, and, when the engagement element slip process is carried out, in order to accelerate the slip of the second clutch 5 with respect to the drive torque of the motor/generator 2, the torque is increased by the clutch slip accelerating torque portion; at the same time, when the preset slip accelerating torque suppression condition is met (when the drive wheel slip condition establishment flag Fs is ON), as compared with the case when the condition is not met, the drive torque of the motor/generator 2 is smaller. Consequently, according to the first embodiment, when the slip accelerating torque suppression condition is not met, as the second clutch 5 slips, the CL slip accelerating torque TT is added to increase the drive torque for the motor/generator 2. As a result, in Application Example 1, the time for starting the slip for the second clutch 5 becomes shorter, and an excellent engine start performance can be realized. On the other hand, in the first embodiment, when the slip accelerating torque suppression condition is met, when the second clutch 5 slips, the quantity of the addition of the CL slip accelerating torque TT to the drive torque of the motor/generator 2 is suppressed to be lower than that when the condition is not met. Consequently, in the first embodiment, it is possible to prevent the drive torque from becoming too large on a road surface μ, and improving the stability of the vehicle behavior and the acceleration feeling is possible.

(2) For the control system of the hybrid vehicle in the first embodiment, the clutch torque control section works as follows: in the engagement element slip process, as the CL slip accelerating torque portion is increased, the CL slip accelerating torque TT for accelerating the slip of the second clutch 5 is added to the drive torque of the motor/generator 2, and, when the slip accelerating torque suppression condition is met, the addition of the CL slip accelerating torque TT is suppressed to be lower than that when the condition is not met. In this way, for the control system of the hybrid vehicle in the first embodiment, the increase of the clutch slip accelerating torque portion for accelerating the slip of the second clutch 5 to the drive torque of the motor/generator 2 is carried out by adding the CL slip accelerating torque TT. Consequently, in the first embodiment, for the increase in the clutch slip accelerating torque portion, it is possible to simplify the process as compared with the case when control is carried out with the total quantity of the drive torque of the motor/generator 2. In addition, in the first embodiment, the addition quantities of the CL slip accelerating torque TT are only different between the case when the slip accelerating torque suppression condition is met and the case when the condition is not met. Consequently, carrying out the process for the increase in the torque of the clutch slip accelerating torque portion and the process for the suppression of this torque increase is easy.

(3) The control system of the hybrid vehicle in the first embodiment includes, in the detecting section, the drive wheel slip condition determining section (steps S103 and S104) that determines whether the condition of the possibility of the slipping of the drive wheels 7, 7 on the road surface is met. In addition, for the control system of the hybrid vehicle in the first embodiment, when the slip accelerating torque suppression condition is met in the clutch torque control section, a determination is made that the condition is met in the drive wheel slip condition determining means. Consequently, for the control system of the hybrid vehicle in the first embodiment, when the condition of the possibility of the slipping of the drive wheels 7, 7 is not met, when the second clutch 5 slips, the CL slip accelerating torque TT is added for the motor/generator 2. As a result, in the first embodiment, it is possible to shorten the time for starting the slip of the second clutch 5, and obtaining a good engine start performance is possible. On the other hand, for the control system of the hybrid vehicle in the first embodiment, when the condition of the possibility of the slipping of the drive wheels is met, when the second clutch 5 slips, the addition quantity of the CL slip accelerating torque TT to the motor/generator 2 is suppressed to be lower than that when the condition is not met. As a result, according to the first embodiment, it is possible to prevent the drive torque from becoming too great on the road surface μ, and improving the stability of the vehicle behavior and improving the acceleration feeling is possible.

(4) For the control system of the hybrid vehicle in the first embodiment, the motor/generator 2 is included halfway between the engine 1 and the drive wheels 7, 7; the first clutch 4 is arranged between the engine 1 and the motor/generator 2; the control system has a mode selecting section 200 that makes the mode transition between the EV mode, in which the second clutch 5 is engaged while the first clutch 4 is disengaged, and the HEV mode, in which the two clutches 4, 5 are engaged; the control system has an engine controller 21 that carries out the start control to start the engine 1 by engaging the first clutch 4 after making the second clutch 5 slip when the mode transition is carried out from the EV mode to the HEV mode; and the integrated controller 20 works as a clutch torque control section to carry out the engagement element slip process in the start control. Consequently, in the first embodiment, when the drive wheel slip condition establishment flag Fs is OFF and the slip accelerating torque suppression condition is not met, as the engine starts, the second clutch 5 is made to slip, and the CL slip accelerating torque TT is added to increase the drive torque for the motor/generator 2. As a result, in the first embodiment, it is possible to shorten the time for the engine start, and realizing a good engine start performance is possible. On the other hand, for the control system of the hybrid vehicle in the first embodiment, in the forward gear-shift step 1 and the forward gear-shift step 2 where the possibility for the slipping of the drive wheels is relatively higher, when the drive wheel slip condition establishment flag Fs is ON and the slip accelerating torque suppression condition is met, in the control of starting the engine 1, the increased quantity of the CL slip accelerating torque TT for the motor/generator 2 is suppressed to be lower than that when the condition is not met. Consequently, in the first embodiment, it is possible to prevent the drive torque from becoming too great on the road surface and improving the stability of the vehicle behavior and improving the acceleration feeling is possible.

(5) For the integrated controller 20, the increased slope Ktr of the added quantity of the CL slip accelerating torque TT is set such that the slope when the drive wheel slip condition establishment flag Fs is ON and the slip accelerating torque suppression condition is met is milder than the slope when the drive wheel slip condition establishment flag Fs is OFF and the slip accelerating torque suppression condition is not met. Consequently, when the drive wheel slip condition establishment flag Fs is ON, the increase of the CL slip accelerating torque TT is miler than that when the flag is OFF, and it is possible to further suppress the generation of the drive wheel slip caused by addition of the CL slip accelerating torque TT.

(6) For the integrated controller 20, the CL slip accelerating torque TT is set to be smaller for the lower gear-shift step. Consequently, in the lower gear-shift step wherein the drive torque of the drive wheels 7, 7 is larger, it is possible to suppress the variation in the increase of the torque in the drive wheels 7, 7, and suppressing the generation of the drive wheel slip caused by the increase in the drive torque by addition of the CL slip accelerating torque TT is possible.

(7) For the integrated controller 20, the increased slope Ktr of the CL slip accelerating torque TT is set to be milder for the lower gear-shift step. Consequently, for the lower gear-shift step with a larger drive torque for the drive wheels 7, 7, it is possible to suppress the variation in the increase of the torque in the drive wheels 7, 7, and suppressing the generation of the drive wheel slip caused by the increase in the drive torque due to the addition of the CL slip accelerating torque TT is possible.

(8) For the integrated controller 20, the determination that the condition of the possibility of the slip of drive wheels 7, 7 is met is made when the TCS control is ON and when the snow mode is ON. In this way, the determination of the possibility of the slipping of the drive wheels 7, 7 is made on the basis of the signal of the existing system, so that there is no need to add a new detecting means for making the determination. At the same time, the process for such a determination can be made easily, and it is possible to simplify the configuration.

In the following, the other embodiments of the present patent application will be explained. As the other embodiments are modified examples of the first embodiment, only the different features will be explained. The same keys as those in the above in the first embodiment will be adopted to show the shared configuration features in the other embodiments, and they will not be explained in detail again.

Embodiment 2

The control system of the hybrid vehicle in the second embodiment differs from the first embodiment in setting the value of the CL slip accelerating torque TT and the increase slope Ktr.

Figure 14:
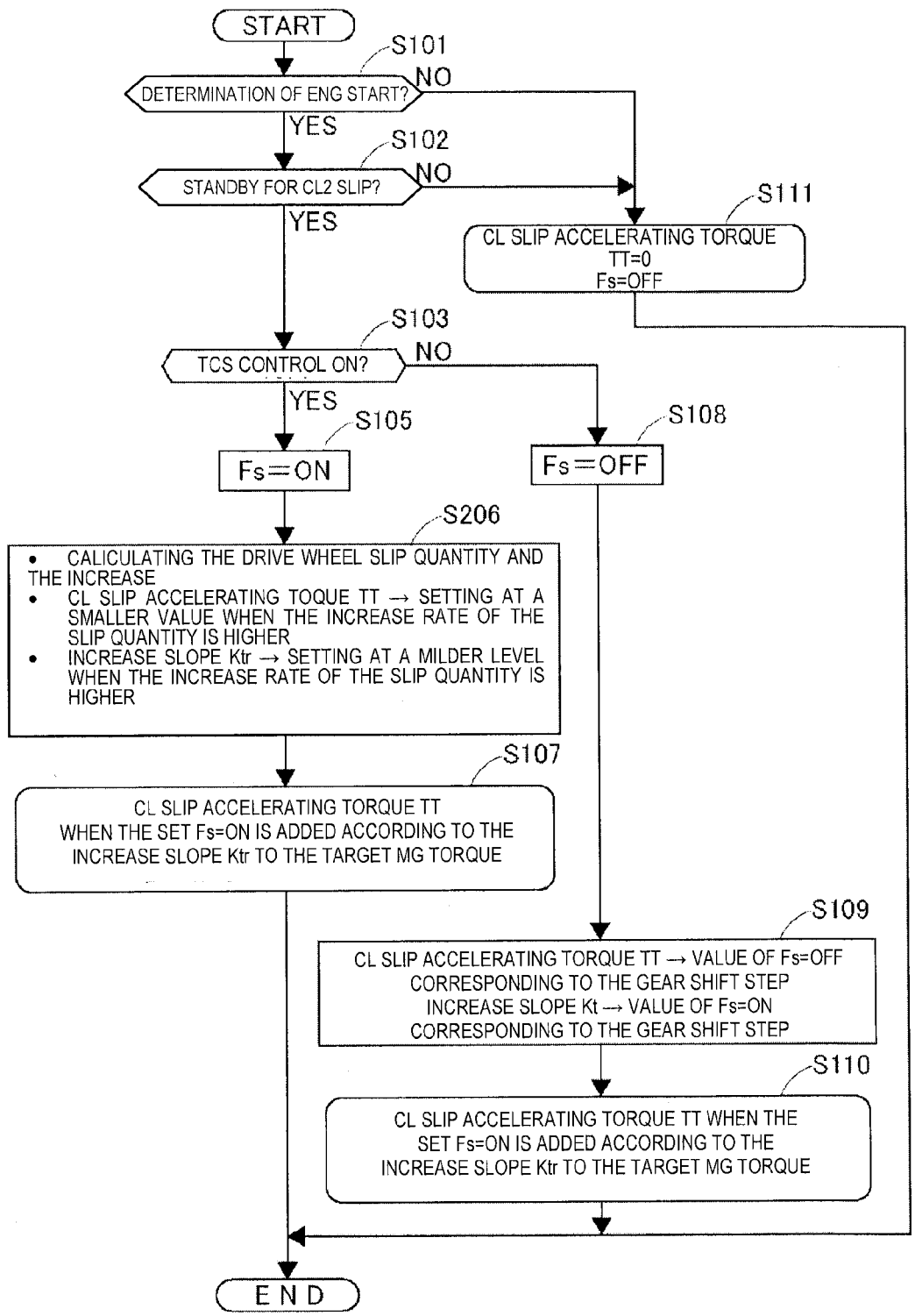
FIG. 14 is a flow chart illustrating the flow of the process of the added torque control as the torque control by the control system in the second embodiment.

FIG. 14 is a flow chart illustrating the flow of the process of the added torque control as the torque control for setting the CL slip accelerating torque TT and the increase slope Ktr in the control system of the hybrid vehicle in the second embodiment. In this flow chart, the feature different from the first embodiment is in the process for setting ON/OFF of the drive wheel slip condition establishment flag Fs and in the process for setting the CL slip accelerating torque TT and the increase slope Ktr.

That is, in the second embodiment, the CL slip accelerating torque TT and the increase slope Ktr are set with the precondition that the drive wheel slip takes place and corresponding to the state of the generation of the drive wheel slip.

Here, in the second embodiment, ON/OFF of the drive wheel slip condition establishment flag Fs for determining whether the condition of the possibility of the slipping of the drive wheels 7, 7 is set only corresponding to ON/OFF of the TCS control. Consequently, in step S103, when the TCS control is ON, just as in the first embodiment, the operation goes to step S105, and the drive wheel slip condition establishment flag Fs is set ON. On the other hand, in step S103, when the TCS control is OFF, the operation goes to step S108, and the drive wheel slip condition establishment flag Fs is set OFF.

In step S206 that is reached when the drive wheel slip condition establishment flag Fs is ON, the feature that the CL slip accelerating torque TT and the increase slope Ktr are set is the same as that in the first embodiment, yet the setting method is different from that in the first embodiment.

That is, in the second embodiment, when the drive wheel slip condition establishment flag Fs is set ON, a drive wheel slip takes place, and, in order to suppress this phenomenon, the TCS control is carried out. Here, in the second embodiment, the increase rate for the drive wheel slip quantity when the TCS control is ON is calculated, and, on the basis of this increase rate, the CL slip accelerating torque TT and the increase slope Ktr are set. In this case, in the second embodiment, the higher that the increase rate of the slip quantity is, the smaller the CL slip accelerating torque TT that is set. Similarly, the higher that the increase rate of the slip quantity is, the milder the increase slope Ktr that is set. In this case, an upper limit is preferably set beforehand for the CL slip accelerating torque TT and the increase slope Ktr. For example, the values T12, T22, as well as Ktr12, Ktr22 in the first embodiment, may be adopted as the upper limit values.

As explained above, in the second embodiment, too, it is possible to suppress the generation of the drive wheel slip caused by the increase in the drive torque due to the addition of the CL slip accelerating torque TT. In addition, the CL slip accelerating torque TT and the increase slope Ktr are set lower as the increase rate of the drive wheel slip quantity is higher. Consequently, it is possible to set these value TT and Ktr at more appropriate values than in the case when they are of constant values. As a result, on a high level, it is possible to prevent the slipping of the drive wheels 7, 7, and to realize a smooth slip of the second clutch 5 at the same time.

Embodiment 3

The control system of the hybrid vehicle in the third embodiment differs from the first embodiment in the process for setting the value of the CL slip accelerating torque TT. That is, the control system of the hybrid vehicle in the third embodiment differs from the first embodiment in that the hydraulic pressure loss time to of the second clutch 5 is added to the condition for setting the drive wheel slip condition establishment flag Fs ON and for suppressing the CL slip accelerating torque TT to the lower level. More specifically, in the third embodiment, in the engine start, when the hydraulic pressure loss time of the second clutch 5 does not go over the preset time (in other words, when starting the engine takes longer), the increase rate of the CL slip accelerating torque TT is limited, and the increase slope Ktr is made milder.

Figure 15:
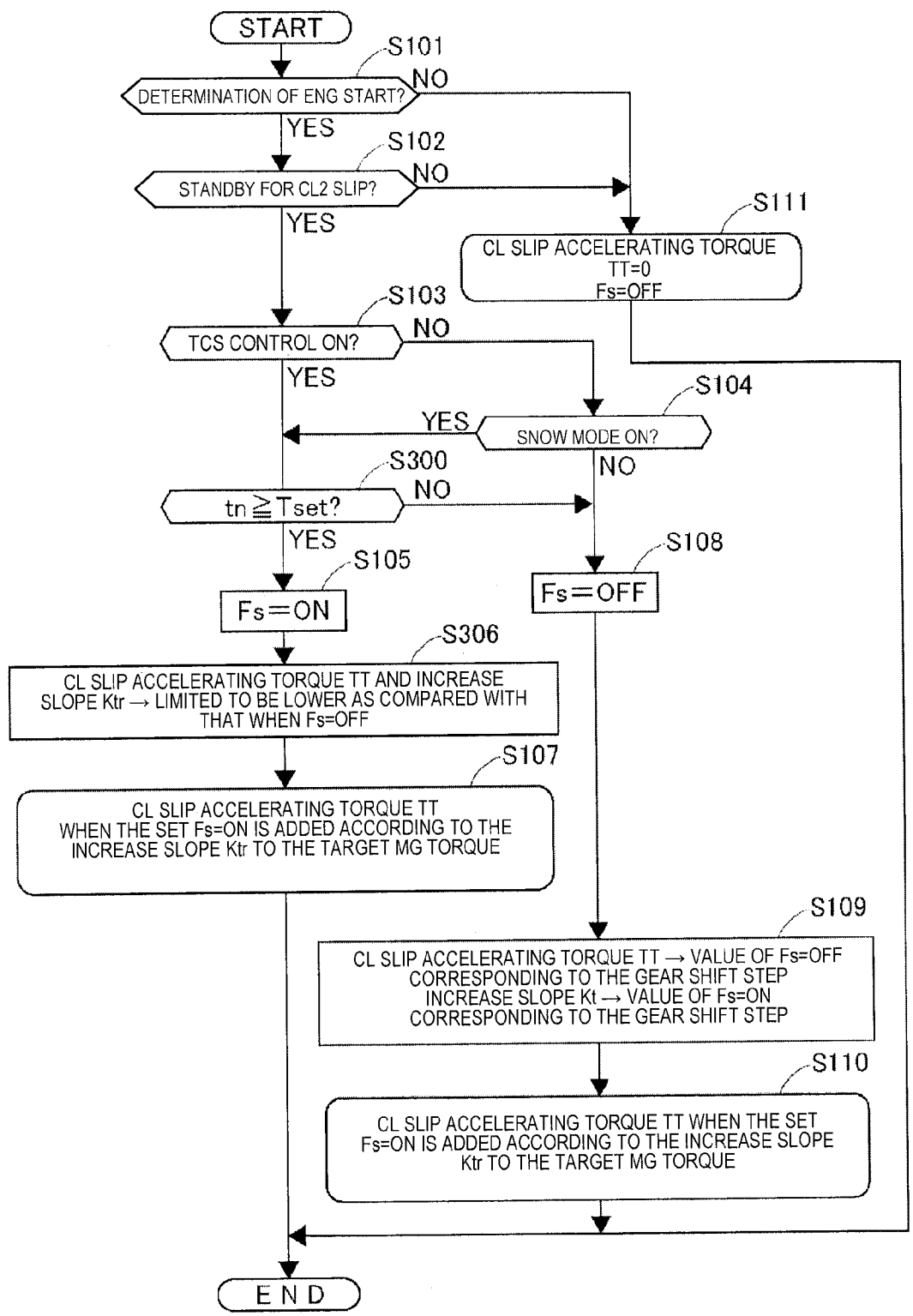
FIG. 15 is a flow chart illustrating the flow of the process of the added torque control as the torque control by the control system in the third embodiment.

FIG. 15 is a flow chart illustrating the flow of the process for the added torque control as the torque control in the third embodiment. This flow chart differs from the first embodiment in that, in step S300 that is reached when YES is the result of the determination in step S103 and step S104, the time tn lapsed from the determination of the transition to the HEV mode is counted, and a determination is made regarding whether this lapsed time tn is longer than the preset hydraulic pressure loss standby time Tset. When the lapsed time tn is not longer than the hydraulic pressure loss standby time Tset, the operation goes to step S108. On the other hand, if the lapsed time is longer than the hydraulic pressure loss standby time Tset, the operation goes to step S105. Here, the hydraulic pressure loss standby time Tset is the time when it is possible to determine that the hydraulic pressure loss responsiveness of the second clutch 5 in a cold region or the like is poorer than the normal case.

In step S306 that is reached from step S108, a comparison is made with the case when the drive wheel slip condition establishment flag Fs is OFF, and the CL slip accelerating torque TT and the increase slope Ktr are limited to the low level. In this case, the increase slope Ktr is preferably set corresponding to the lapsed time tn, that is, set milder when the lapsed time tn is longer. For the CL slip accelerating torque TT, the lapsed time is also set at a smaller value when the lapsed time tn is longer.

Figure 16:
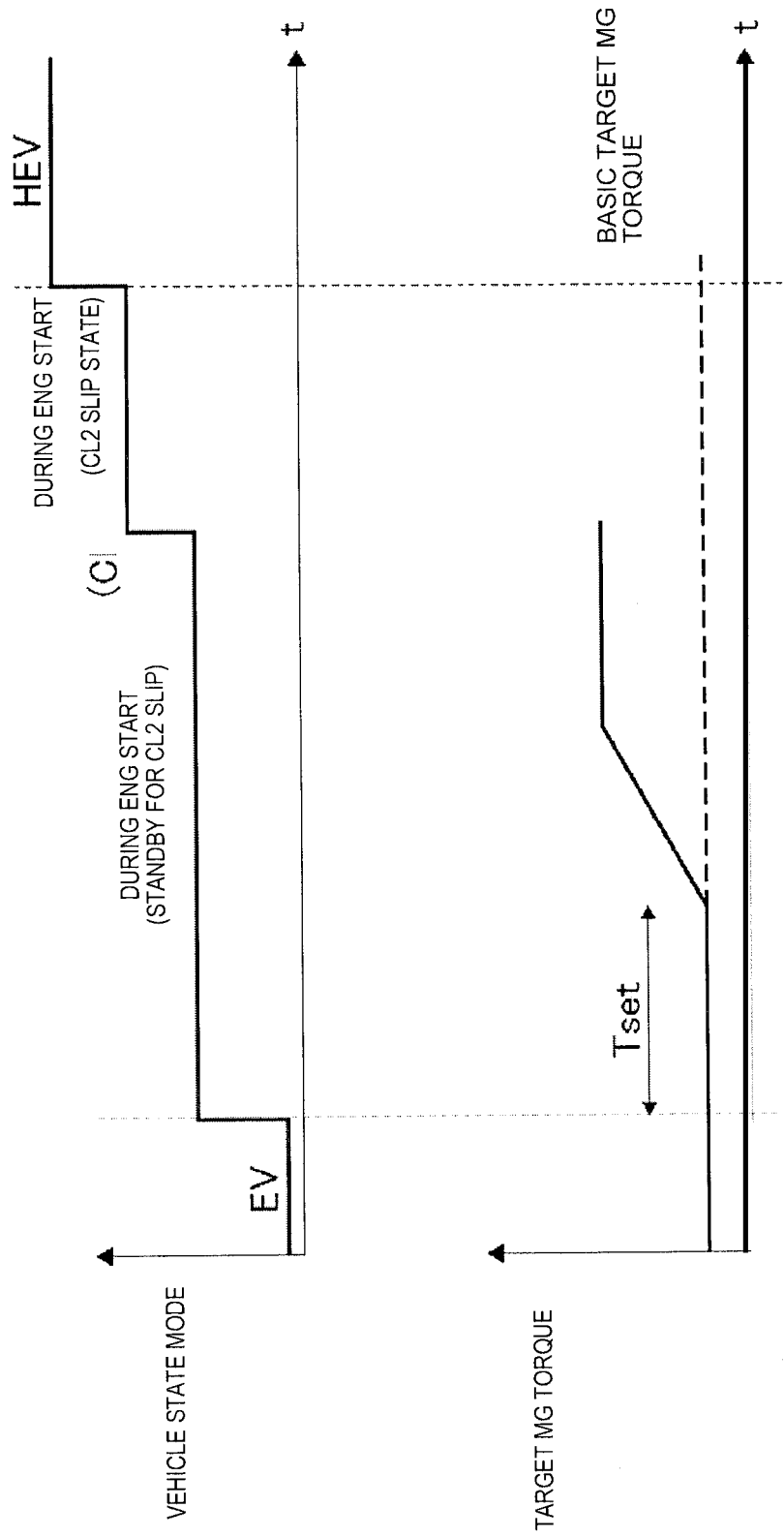
FIG. 16 is a time chart illustrating an example of the variation in the vehicle state mode and the target MG torque when the added torque control is carried out when starting the engine with the control system in the third embodiment.

As shown in FIG. 16, in the third embodiment, when the limit is applied on the CL slip accelerating torque TT and the increase slope Ktr, after standby for the hydraulic pressure loss standby time Tset set for the hydraulic pressure loss of the second clutch 5, the CL slip accelerating torque TT is added at the limited increase slope. Here, the addition of the CL slip accelerating torque TT is maintained until the mode switch from the engine start mode.

Consequently, in the third embodiment, when the vehicle runs in a cold region or the like, and the hydraulic pressure responsiveness is poorer, as the hydraulic pressure loss responsiveness of the second clutch 5 becomes poor and a longer time is needed for starting the engine, the CL slip accelerating torque TT and the increase slope Ktr are suppressed to be lower, so that it is possible to suppress the generation of the slipping of the drive wheels caused by the addition of the CL slip accelerating torque TT.

In the above, an explanation has been made regarding the first through the third embodiments for the control system of the electrically driven vehicle of the present invention. However, the present invention is not limited to the first through the third embodiments. As long as the main points of the inventions related to the claims are observed, it is possible to make changes and additions, etc. to the design.

For example, in the first through the third embodiments, as an example of the engine start, the drive torque is increased by adding the CL slip accelerating torque TT and the second clutch 5 as the drive transmission engagement element is made to slip. However, the slip of the second clutch 5 is not limited to the engine start. For example, the slip of the second clutch may also be adopted in the WSC mode and in the case of controlling a minute slip. In addition, for the engine start, in addition to the compression of the accelerator pedal as shown in the first through the third embodiments, it also can be adopted in the start of the idling state without step-down of stepping down on the accelerator pedal.

Here, as the WSC mode, by means of the control of the rotational speed of the motor/generator 2, the second clutch 5 is kept in the slip engaged state, and, for the clutch transmission torque going through the second clutch 5, the running mode has the clutch torque capacity controlled so that the required drive torque is determined corresponding to the vehicle state and the manipulation of the driver. When the second clutch 5 slips as the WSC mode is formed, the CL slip accelerating torque TT may also be added. In this case, the following scheme may also be adopted: as the present invention is adopted, when the condition of the possibility of the slipping of the drive wheels is met (when the TCS control is ON or the like), the added value is suppressed to a lower level, and the limited added torque is carried out.

In addition, there is also the following case: the CL accelerating torque is applied when control is carried out to provide a minute slip to the second clutch. This minute slip may be applied in, for example, the case of the transition from the HEV mode to the EV mode or during the running in the EV mode while the control responsiveness is to be improved by switching to the HEV mode, etc. When such a minute slip control is carried out, when the slip is generated, it is possible to add the CL slip accelerating torque TT to increase the drive torque. In this case of increase, just as in the case described above, the present invention may be adopted so that, when the condition of the possibility of the slipping of the drive wheels is met (when the TCS control is ON, etc.), the limited added torque is carried out for suppressing the increased value to a lower level. In addition, the minute slip control may also be carried out in the electrically driven vehicle. The present invention is not limited to the hybrid vehicle shown in the first through the third embodiments.

Figure 17A:
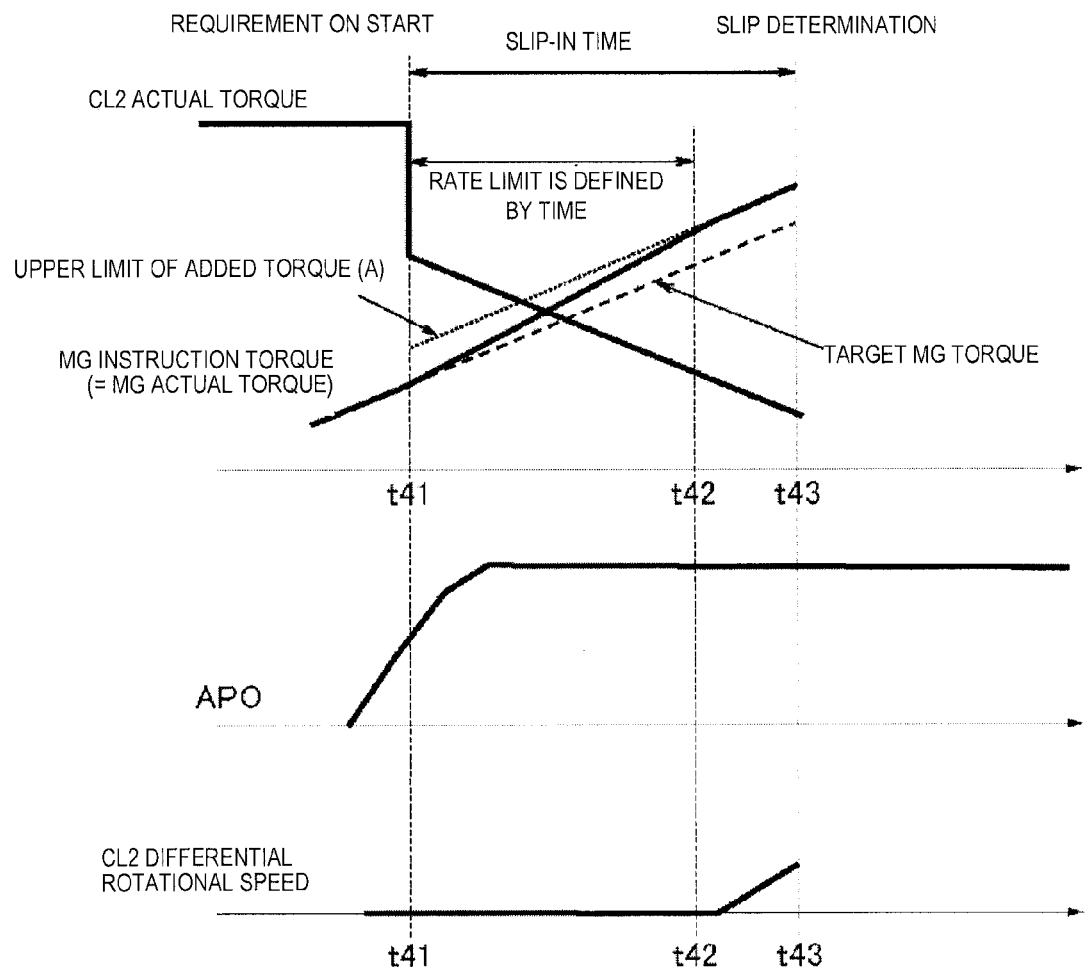
FIG. 17A is a diagram illustrating the operation of the fourth embodiment. This figure shows the case in which the CL slip accelerating torque is added normally.

As explained above, the present invention is adopted when the engine starts. This, however, is not limited to the case when the accelerator pedal is compressed as described in the first through the third embodiments. The present invention may also be adopted in the engine start in the idling drive state. That is, the condition of the suppression of the slip accelerating torque may also be the start of the engine in the idling drive state. In this case, the increase in the drive torque by the addition of the CL slip accelerating torque TT may be set at 0 so that no acceleration feeling is given to the driver due to the CL slip accelerating torque TT. In the following, with reference to FIG. 17, the fourth embodiment, in which the increase in the drive torque by the addition of the CL slip accelerating torque TT is suppressed at the start of the engine in the idling drive state, will be explained. In the fourth embodiment shown in FIG. 17, usually, when the target drive torque is relatively larger, such as in the case of a deep compression of the accelerator pedal, the added torque ($\alpha$) as the CL slip accelerating torque TT is set larger within the range of the upper limit value. Also, when the driving shaft slip condition is met, such as in the case of the TCS control, as shown in the first embodiment, the added torque ($\alpha$) is suppressed to a relatively smaller value. In addition, when the second clutch 5 is made to make negative slip, such as in the idling start, in order to suppress the generation of the positive slip, the added torque ($\alpha$) is suppressed to zero. FIG. 17A is a time chart illustrating an example in which the added torque ($\alpha$) is added at start of the engine as the accelerator pedal is compressed, usually when the condition for suppressing the slip of the accelerating torque is not met. In this case, as the accelerator pedal is compressed, the accelerator position opening APO increases. At the time point t41, a determination is made that there is a requirement for starting the engine. For the target MG torque, the added torque ($\alpha$) is added gradually during a prescribed time defined by the rate limit, and, at the time t42, the upper limit value of the added torque ($\alpha$) is added. Consequently, right after that, a rotational speed difference (the slip) takes place in the second clutch 5; at the time t43, a slip is determined. Here, in this case, the target MG torque is of the value obtained by adding the transmission torque estimated value in the first clutch 4 for the engine start to the target drive torque.

Figure 17B:
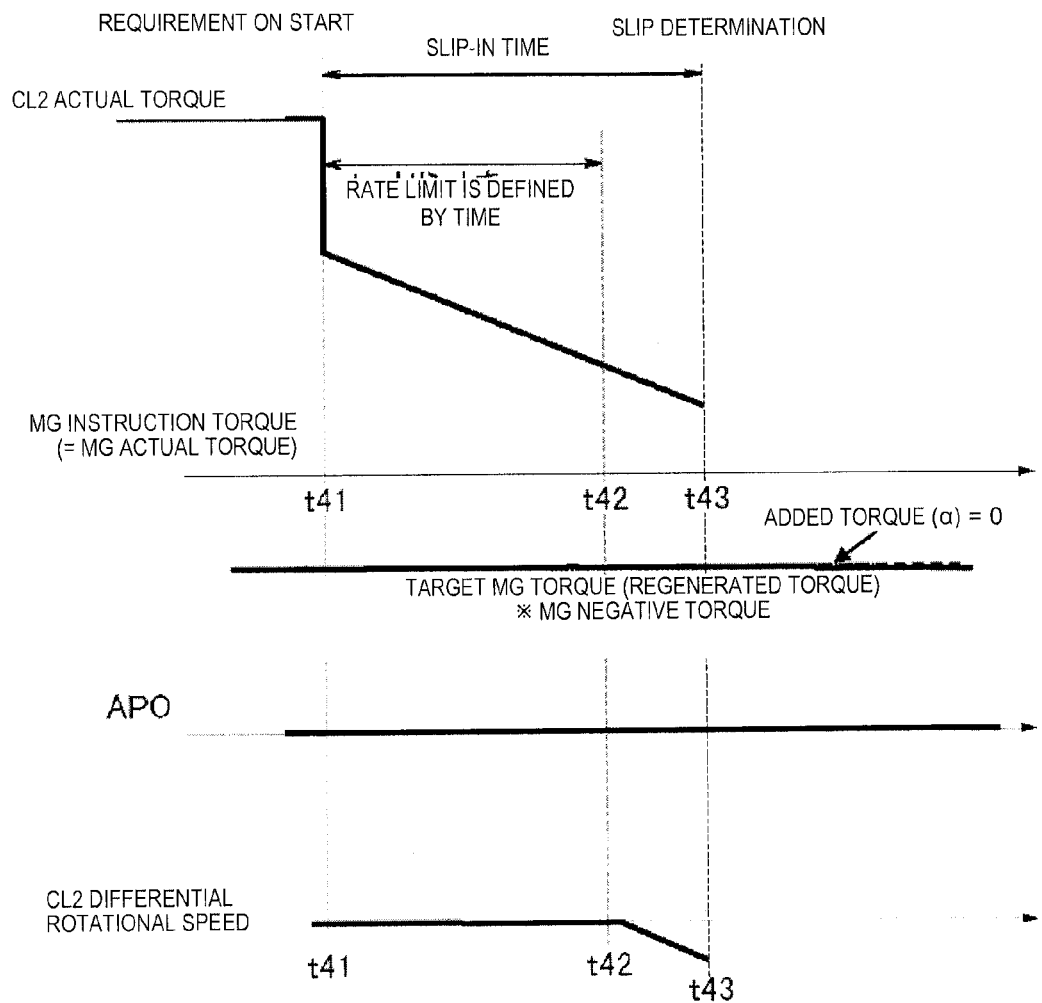
FIG. 17B is a time chart illustrating the operation of the fourth embodiment. This figure shows the case in which the addition of the CL slip accelerating torque is suppressed to zero.

On the other hand, FIG. 17B is a time chart in the case of the added torque ($\alpha$) equal to 0 when the engine starts in the idling drive state (in the inertia drive state, with accelerator position opening APO equal to 0) when the accelerator pedal is not compressed, that is, when the slip accelerating torque suppression condition is the method. In such idling, the regeneration takes place by the motor/generator 2. Consequently, the target MG torque becomes a negative value. In this case, because the second clutch 5 is in the negative slip state, control is made to have the added torque ($\alpha$) equal to 0. Consequently, in the idling drive state, there is no positive slip due to the added torque portion. As a result, after the time t42 when the rate limit time lapses, a rotational speed difference (the negative slip) takes place. In this way, for the control system in the fourth embodiment, on the basis of the detection by the detecting section, the engagement element slip process is carried out with the slip of the second clutch 5, and, during the engagement element slip process, the CL slip accelerating torque for accelerating the slip of the drive transmission engagement element with respect to the drive torque of the motor/generator 2 is added; at the same time, the added torque control is carried out so that this clutch slip accelerating torque is suppressed to "0" when the preset slip accelerating torque suppression condition (when the engine starts in the idling drive state) is met, which is lower than that that when the condition is not met. Consequently, in the idling drive state, the drive torque of the drive wheels 7, 7 does not become excessive. As a result, it is possible to have the second clutch 5 in the negative slip with a high reliability, and preventing an acceleration feeling for the driver is possible.

In the first through the third embodiments, the examples show the case in which the second clutch 5 is selected from the frictional elements included in the step-type automatic transmission 3. However, the following examples are also included: the example in which a second clutch 5 different from the automatic transmission 3 is arranged between the motor/generator MG and the input shaft of the transmission, and the example in which a second clutch 5 different from the automatic transmission 3 is arranged between the output shaft of the transmission and the driving shaft.

In the first embodiment, as the mode switching means for switching the HEV mode and the EV mode, the first clutch 4 is in use as an example. However, the mode switching means for switching the HEV mode and the EV mode may also be made of a differential apparatus or a power dividing apparatus that can display the clutch function without using a clutch, such as the planetary gear unit or the like.

In the first through the third embodiments, the rear wheels are used as the drive wheels. However, the front wheels may also be used as the drive wheels.

In the first through the third embodiments, ON of the TCS control and ON of the snow mode are taken as meeting the condition of the easy generation of the slipping of the drive wheels. However, the present invention is not limited to this scheme. That is, one may also adopt a scheme in which the determination on the basis of the difference between the drive wheel rotational speed and the slave wheel rotational speed (the actual vehicle body speed) is taken as meeting of the condition for the easy generation of the drive wheel slip. Also, when there is a means for determining the road surface $\mu$, the determination that the road surface $\mu$ is higher than the preset level may also be adopted for meeting the condition. Also, one may adopt the signal for the detection of snow fall or rain fall for the determination. In addition, the road surface $\mu$ may be detected on the basis of the difference between the drive wheel rotational speed and the slave wheel rotational speed or on the basis of the wheel acceleration during braking or acceleration.

In the first through the third embodiments, when the slip condition with the drive wheel slip condition establishment flag Fs ON is met, while the CL slip accelerating torque TT is set low, the increase slope Ktr is set to be mild. However, one may also adopt a scheme in which only one of them is carried out.

In addition, in the first through the third embodiments, during the engagement element slip process, the clutch slip accelerating torque portion for accelerating the slip of the drive transmission engagement element for the drive torque of the motor/generator is increased, and the clutch slip accelerating torque is added to the target MG torque. However, the present invention is not limited to the addition scheme as long as the clutch slip accelerating torque portion is increased for the drive torque of the motor/generator when the engagement element slip process is carried out with the slipping of the drive transmission engagement element. More specifically, the target MG torque itself may be controlled as well. In this case, during the engagement element slip process, instead of the calculating formulas for the non-slip process and for the target MG torque, the same calculating formula may be adopted for both of them. In this case, in the engagement element slip process, the coefficients of the calculating formulas can be selected to be different.

The invention claimed is:

1. A vehicle control system of the electrically driven vehicle comprising:
   a motor/generator arranged in a driving system of a drive wheel for driving the drive wheel by powering and carries out electric power generation by regeneration,
   a drive transmission engagement element arranged between the motor/generator and the drive wheel,
   a detecting section that detect a driving state and a running state, and
   a clutch torque control section programmed to carry out the torque control as follows: based on a detection by the detecting section, the clutch torque control section carries out the engagement element slip process so that the driving transmission engagement element is made to slip, and, when the engagement element slip process is carried out, the target motor/generator torque, which is increased from the drive torque of the motor/generator by a clutch slip accelerating torque portion for accelerating slipping of the driving transmission engagement element, is output from the motor/generator, and a drive wheel slip condition determining section that determines whether a condition of a possibility of the drive wheel slipping on a road surface is met;

the clutch torque control section programmed to work as follows: when a determination is made that the condition is met in the drive wheel slip condition determining section, the engagement element slip process is carried out here, as compared with the case when a determination is made by the drive wheel slip condition determining section that the condition is not met, the target motor/generator torque from the motor/generator is smaller.

2. The vehicle control system according to claim 1, wherein the clutch torque control section programmed to work as follows: in the engagement element slip process, as the clutch slip accelerating torque portion is increased, the clutch slip accelerating torque for accelerating the slip of the drive transmission engagement element is added to the driving torque of the motor/generator, and, when a determination is made that the condition is met, an addition of the clutch slip accelerating torque is suppressed to be lower than that when the condition is not met.

3. The vehicle control system according to claim 2, wherein the motor/generator is included halfway between the engine and the drive wheel, and a mode switching engagement element is arranged between the engine and the motor/generator, and further comprising:

a mode control section programmed to make mode transition between the electrically driven vehicle mode in which the drive transmission engagement element is engaged while the mode switching engagement element is disengaged and the hybrid vehicle mode in which the drive transmission engagement element and the mode switching engagement element are engaged;

an engine start control section programmed to carry out the start control to start the engine by engaging the mode switching engagement element after making the drive transmission engagement element slip when the mode transition is carried out from the electrically driven vehicle to the hybrid vehicle mode; and the clutch torque control section being programmed to carry out the engagement element slip process in the start control operation.

4. The vehicle control system according to claim 3, wherein the clutch torque control section being programmed to set an increased slope of the clutch slip accelerating torque such that the slope when a determination is made that the condition is met is set to be milder than that when a determination is made that the-condition is not met.

5. The vehicle control system according to claim 3, wherein a detecting section that a slip quantity of the drive wheel;

the clutch torque control section being programmed to set the clutch slip accelerating torque when a determination is made that the-condition is met to be smaller for a higher increase rate of the slip quantity of the drive wheel.

6. The vehicle control system according to claim 5, wherein the clutch torque control section is further programmed to set the increase rate of the clutch slip accelerating torque when a determination is made that the condition is met to be milder when the increase rate of the slip quantity of the drive wheel is higher.

7. The vehicle control system according to claim 3, wherein the clutch torque control section is further programmed to set the clutch slip accelerating torque when a determination is made that the-condition is met corresponding to a time needed for engine start, with the clutch slip accelerating torque set to be smaller when the time needed for engine start is longer.

8. The vehicle control system according to claim 3, wherein the clutch torque control section is further programmed to set an increased slope of the clutch slip accelerating torque when a determination is made that the-condition is met corresponding to time needed for engine start, with the clutch slip accelerating torque set to be milder as the time needed for engine start is longer.

9. The vehicle control system according to claim 3, wherein the driving system has a transmission; and the clutch torque control section is further programmed to set the clutch slip accelerating torque when the slip accelerating torque suppression condition is met to be smaller for a lower gear-shift step of the transmission.

10. The vehicle control system according to claim 1, wherein the motor/generator is included halfway between the engine and the drive wheel, and a mode switching engagement element is arranged between the engine and the motor/generator, and further comprising:

a mode control section programmed to make mode transition between the electrically driven vehicle mode in which the drive transmission engagement element is engaged while the mode switching engagement element is disengaged and the hybrid vehicle mode in which the drive transmission engagement element and the mode switching engagement element are engaged;

an engine start control section programmed to carry out the start control to start the engine by engaging the mode switching engagement element after making the drive transmission engagement element slip when the mode transition is carried out from the electrically driven vehicle to the hybrid vehicle mode; and the clutch torque control section being programmed to carry out the engagement element slip process in the start control operation.

11. The vehicle control system according to claim 10, wherein the clutch torque control section being programmed to set an increased slope of the clutch slip accelerating torque such that the slope when a determination is made that the condition is met is set to be milder than that when a determination is made that the condition is not met.

12. The vehicle control system according to claim 10, further comprising a detecting section that a slip quantity of the drive wheel;

the clutch torque control section being programmed to set the clutch slip accelerating torque when a determination is made that the condition is met to be smaller for a higher increase rate of the slip quantity of the drive wheel.

13. The vehicle control system according to claim 12, wherein
the clutch torque control section is further programmed to set the increase rate of the clutch slip accelerating torque when a determination is made that the condition is met to be milder when the increase rate of the slip quantity of the drive wheel is higher.

14. The vehicle control system according to claim 10, wherein
the clutch torque control section is further programmed to set the clutch slip accelerating torque when a determination is made that the condition is met corresponding to a time needed for engine start, with the clutch slip accelerating torque set to be smaller when the time needed for engine start is longer.

15. The vehicle control system according to claim 10, wherein
the clutch torque control section is further programmed to set an increased slope of the clutch slip accelerating torque when a determination is made that the condition is met corresponding to time needed for engine start, with the clutch slip accelerating torque set to be milder as the time needed for engine start is longer.

16. The vehicle control system according to claim 10, wherein
the driving system has a transmission; and
the clutch torque control section is further programmed to set the clutch slip accelerating torque when the slip accelerating torque suppression condition is met to be smaller for a lower gear-shift step of the transmission.

17. The vehicle control system according to claim 10, wherein
the driving system has a transmission, and
the clutch torque control section is further programmed to set an increased slope of the clutch slip accelerating torque when a determination is made that the condition is met to be milder for a lower gear-shift step of the transmission.

18. The vehicle control system according to claim 10, wherein
when idling starts as the engagement element slip process is carried out, the clutch torque control section is further programmed to decrease the target motor/generator torque output from the motor/generator.

19. The vehicle control system according to claim 1, further comprising
a driving shaft slip condition determining section programmed to work as follows: when TCS control is ON, or when a snow mode is set as the running mode, a determination is made that the condition of the possibility of the slip of the drive wheel on the road surface is met.

* * * * *